(12) United States Patent
Hatcherson et al.

(10) Patent No.: US 8,881,094 B2
(45) Date of Patent: Nov. 4, 2014

(54) CONTAINER-BASED ARCHITECTURE FOR SIMULATION OF ENTITIES IN A TIME DOMAIN

(75) Inventors: Robert Allen Hatcherson, Fort Worth, TX (US); Richard Keith Holt, Fort Worth, TX (US); Stephen Edward Tarter, Fort Worth, TX (US); Jeremiah Jay Johnson, Arlington, TX (US); Frederick Bryan Fleury, Fort Worth, TX (US); George William Estep, II, Fort Worth, TX (US)

(73) Assignee: Zedasoft, Inc., Fort Worth, TX (US)

( * ) Notice: Subject to any disclaimer, the term of this patent is extended or adjusted under 35 U.S.C. 154(b) by 573 days.

(21) Appl. No.: 13/317,447

(22) Filed: Oct. 18, 2011

(65) Prior Publication Data

US 2012/0117533 A1 May 10, 2012

Related U.S. Application Data

(63) Continuation-in-part of application No. 12/378,905, filed on Feb. 20, 2009, now Pat. No. 8,150,664, which is a continuation-in-part of application No. 11/140,109, filed on May 27, 2005, now Pat. No. 7,516,052.

(60) Provisional application No. 60/575,655, filed on May 27, 2004.

(51) Int. Cl.
  *G06F 9/45* (2006.01)
  *G06F 9/44* (2006.01)
  *G06F 17/50* (2006.01)

(52) U.S. Cl.
  CPC ........ *G06F 17/5009* (2013.01); *G06F 2217/16* (2013.01)

USPC .............................................. 717/101; 703/22

(58) Field of Classification Search
  CPC .......... H04Q 2213/13503; H04Q 2213/13526; G06F 17/30958; G06F 8/47; G06F 9/443; G06F 11/3447; G06F 17/5009; G06T 11/206; G06T 2200/24
  See application file for complete search history.

(56) References Cited

U.S. PATENT DOCUMENTS

| | | | |
|---|---|---|---|
| 5,598,532 A | 1/1997 | Liron | |
| 5,911,076 A * | 6/1999 | Acker et al. | ........... 717/147 |
| 6,380,954 B1 | 4/2002 | Gunther | |
| 7,080,092 B2 | 7/2006 | Upton | |
| H2201 H | 9/2007 | Stytz et al. | |

(Continued)

OTHER PUBLICATIONS

Engelke, NH. El al., "Integrated Manufacturing Modeling System," Jul. 1985, International Business machines Corporation.

*Primary Examiner* — Chat Do
*Assistant Examiner* — Sergio J Curbelo, III
(74) *Attorney, Agent, or Firm* — Schultz & Associates, P.C.

(57) ABSTRACT

The present invention relates generally to a software architecture for simulation of physical entities. The invention provides an object-oriented container-based framework architecture for simulator implementations, methods, and objects in a time domain on a distributed computer network and in field deployed units. The invention further provides an interface system and a plug-in definition which allows compartmentalization of participants in the container and easy extensibility of the system. A hierarchy of life-cycle containers having contained objects is disclosed. An object graph description is used by an assembly engine to construct an executable object graph including the hierarchy of life-cycle containers. Life-cycle containers can be implemented as LRU portable containers for field deployed units.

43 Claims, 15 Drawing Sheets

(56) References Cited

U.S. PATENT DOCUMENTS

| | | | |
|---|---|---|---|
| H2201 H | * | 9/2007 | Stytz et al. ............... 717/104 |
| 7,275,237 B1 | | 9/2007 | Schneider et al. |
| 2002/0059467 A1 | | 5/2002 | Rapp et al. |
| 2002/0087744 A1 | | 7/2002 | Kitchin |
| 2002/0184301 A1 | | 12/2002 | Parent |
| 2002/0184348 A1 | | 12/2002 | Rapp et al. |
| 2003/0033369 A1 | | 2/2003 | Bernhard |
| 2003/0058277 A1 | | 3/2003 | Bowman-Amuah |
| 2003/0079052 A1 | | 4/2003 | Kurshnirskiy |
| 2003/0126311 A1 | | 7/2003 | Kurshnirskiy et al. |
| 2003/0174147 A1 | | 9/2003 | Jaffe |
| 2003/0177282 A1 | | 9/2003 | Hejlesberg et al. |
| 2004/0015822 A1 | | 1/2004 | Linton et al. |
| 2004/0186764 A1 | | 9/2004 | McNeill |
| 2005/0267731 A1 | | 12/2005 | Hatcherson et al. |

* cited by examiner

CONTAINER-BASED ARCHITECTURE FOR SIMULATION OF ENTITIES IN A TIME DOMAIN

CROSS REFERENCE TO RELATED APPLICATIONS

This application is a continuation in part of U.S. application Ser. No. 12/378,905 filed Feb. 20, 2009 now U.S. Pat. No. 8,150,664, which is a continuation in part of U.S. application Ser. No. 11/140,109 filed May 27, 2005, now U.S. Pat. No. 7,516,052 issued Apr. 7, 2009, which claims priority to U.S. Provisional Application No. 60/575,655 filed on May 27, 2004.

TECHNICAL FIELD OF THE INVENTION

This disclosure relates generally to software architecture for simulation of physical entities. In particular, this disclosure relates to an object-oriented container-based framework architecture for simulating the function and position of physical entities in a time domain on a distributed computer network.

BACKGROUND OF THE INVENTION

A software design framework is an architectural pattern that provides an extendable template for applications. In the context of object-oriented computer software, a framework provides a set of classes that can be extended via sub-classing or used directly to solve a particular problem within a particular problem domain. A set of objects implemented within the set of classes then works together to carry out responsibilities within the particular problem domain and a family of applications.

One example of the object-oriented framework architecture is a concept of a container. A container provides an execution environment for components that cannot execute alone.

Containers interact with contained components through predefined interfaces. A class from the set of classes implements an interface by either implementing the interface's methods directly, or inheriting implementations from superclasses. Instances of such classes can be woven into a tree of objects within the limits of assembly rules hard-coded in the various classes. Such a tree of objects is called an object graph. Object graphs are the software representation of some real-world problem to be modeled in a computer.

An object-oriented framework architecture is described in U.S. Publication No. 2002/0059467 entitled "Object-Oriented Framework Architecture for Sensing and/or Control Environments." Another object-oriented sensing and control framework is described in U.S. Publication No. 2002/0184348 entitled "Object-Oriented Framework Architecture for Sensing and/or Control Environments."

In prior art object-oriented programming, the assembly and execution of object graphs is based on code that weaves components together in a rigid way based on a static model. However, this static model does not provide flexibility because a software developer is required to extend, delete, replace or rearrange the object graph's components. In addition, object graphs are typically closed once built. They can only be modified at runtime within hard-coded constraints, their structure cannot be examined, and arbitrary locations in the graph cannot be interrogated for data. Therefore, it is desirable to have an object assembly and execution life cycle model that allows properly constructed objects to be assembled in a flexible declarative manner.

The prior art does not disclose or suggest the use of fractal like containers to describe and manipulate models of physical entities in a time domain, using an object assembly and execution life cycle model that allows properly constructed objects to be assembled in a flexible declarative manner.

SUMMARY OF THE INVENTION

The present invention provides a container-based software architecture having an object-oriented simulation framework and containers for providing realistic simulation environments for physical entities in a time domain over a distributed computer network.

The present invention further provides a software architecture that can be used to realize a simulation for any group of arbitrary entities and their environment or surroundings as related to time.

Other features of the present invention will be or become apparent to one with skill in the art upon examination of the drawings and detailed description. It is intended that all such additional features be included within this description, be within the scope of the present invention, and be protected by the accompanying claims.

BRIEF DESCRIPTION OF THE DRAWINGS

Many of the aspects of the invention can be better understood with reference to the following drawings. The components in the drawings are not necessarily to scale, emphasis instead being placed upon clearly illustrating the principles of the present invention.

DETAILED DESCRIPTION

Figure 1:
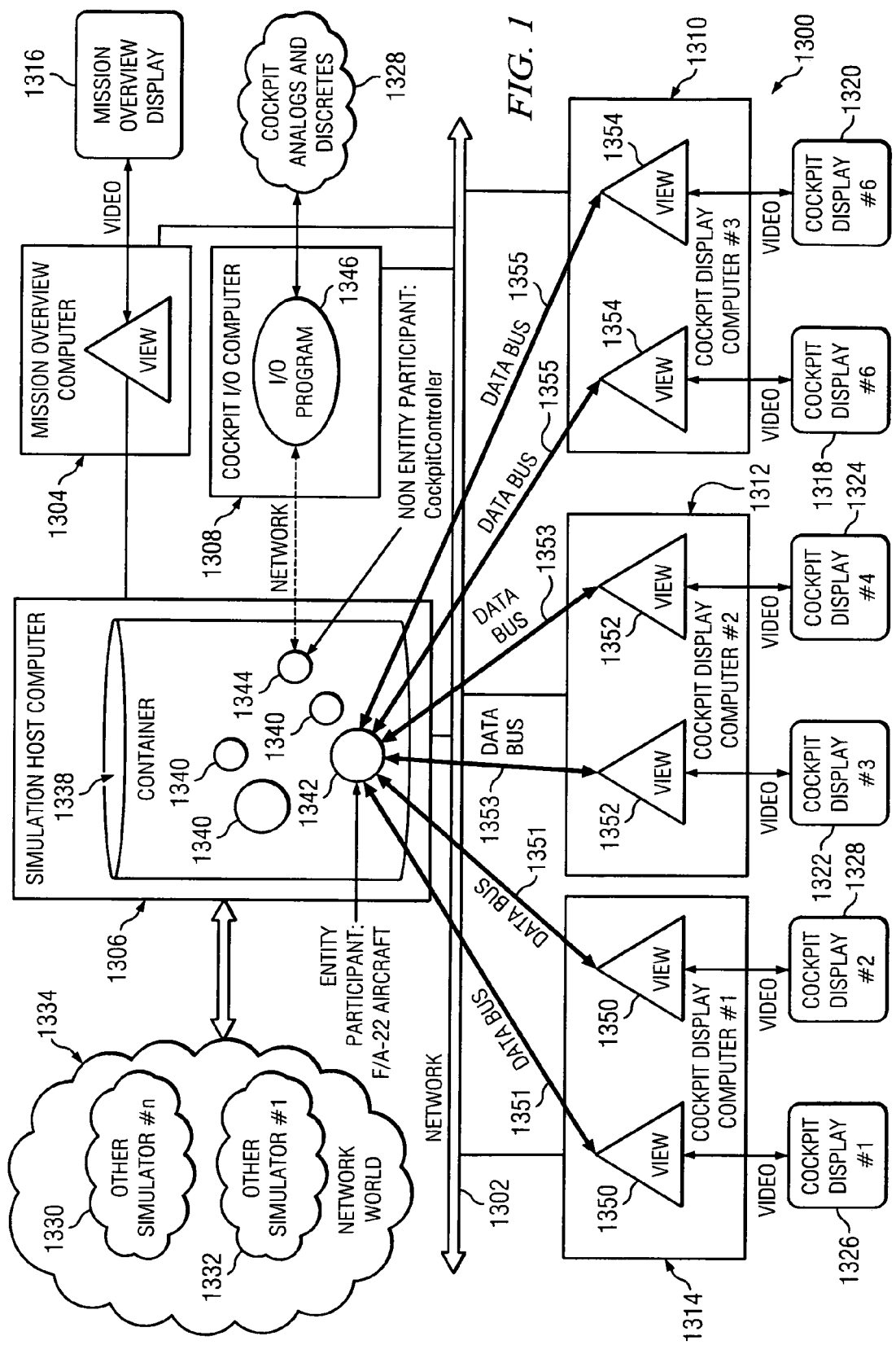
FIG. 1 is a schematic diagram of a network and software architecture provided by the present invention.

The following discussion is presented to enable a person skilled in the art to make and use the invention. The general principles described may be applied to embodiments and applications other than those detailed below without departing from the spirit and scope of the present invention as defined by the claims. The present invention is not intended to be limited to the embodiments shown, but is to be accorded the widest scope consistent with the principles and features disclosed.

The following definitions are used throughout this application as relating to object-oriented design of computer software:

"Class" means a collection of data and executable code that together defines a model or template of a concept or physical thing. A class is a blueprint, or prototype, that defines the attributes and methods common to all objects of a certain kind. A class definition ensures all objects of a class will have the same structure and behavior. Classes can be aggregated hierarchically to build complex models.

"Inheritance" is a property of classes that allows subclasses to inherit attributes and methods code from other classes. Inheritance defines a level of hierarchy among classes and facilitates defining objects in terms of other objects.

"Superclass" means a class from which other classes inherit attributes and methods.

"Subclass" means classes that inherit attributes and methods from other classes.

"Instance" means a single distinct object of a class. Just as a class can be thought of as a template for objects to be created, instances can be thought of as created objects.

"Instantiation" means the creation of objects whose functions and characteristics are determined by associated class definitions.

An "object" is the actual representation created from a class, and is the result of instantiation. When an object is created a usable instance of a class is created and is stored in memory.

An "object graph" is a representation of a real-world scenario as a tree of objects constructed and executed to simulate the real-world scenario.

"Method" means executable operations that can be performed against either a class or an instance. Instance methods are functions associated with objects. Class methods are functions associated with classes.

"Interface" means a device that allows objects to communicate with each other or with a class or container into which it is instantiated. An interface defines a set of methods without defining their implementation.

"Plug-in" means a subset of code, such as binary files, that implements the methods of an interface. A plug-in is an extension mechanism that allows new types of participants to be added to a container through implementation of predefined interfaces.

The following definitions are used throughout this application as relating to the simulation problem domain in terms of a container and contained objects:

"Container" means an execution environment for objects that cannot execute in a standalone mode.

"Contained Object" means an object contained within a container. The contained object can also be a container allowing for containers to be nested within one another.

"Entity" means a type of simulation participant or object that serves as a superclass for models of real or imaginary physical things (e.g., aircraft, sea vessels, land vehicles, radar emission energy, and radio waves).

"Environment" means a description of the virtual world within which entities execute.

"Non-entity" means an object that is a simulation participant with tasks defined for communication with network hardware or other activities not directly related to entity interaction during a running simulation.

"View" means a way to examine a simulation container and/or its contained participants.

"Data bus" means a commonly accessible data block through which logical data is shared between entities and view containers.

"Life cycle" means the instantiation, execution and termination of a container or contained object according to the methods of the container or contained object.

An embodiment of a container-based architecture and system provided by the present invention is shown in FIG. 1 at 1300. A network 1302 is connected via Ethernet to a mission overview computer 1304, a simulation host computer 1306, a cockpit IO computer 1308, cockpit display computer 1310, cockpit display computer 1312 and cockpit display computer 1314.

Mission overview computer 1304 is in turn connected to mission overview display 1316. Cockpit display computer 1310 is connected to cockpit displays 1318 and 1320. Cockpit display computer 1312 is connected to cockpit displays 1322 and 1324. Cockpit display computer 1314 is connected to cockpit displays 1326 and 1328. Cockpit JO computer 1308 is connected to cockpit analog devices 1328.

A simulation host computer 1306 is connected to simulation system 1330 and simulation system 1332 by external network 1334, communicating through TCP/IP protocol and UDP/IP protocol as known in the art.

Simulation host computer 1306 supports container 1338 in which are instantiated multiple participant objects 1340, entity participant 1342 and non-entity participant object 1344. Non-entity participant object 1344 communicates via network 1302 to input/output program 1346 running on cockpit IO computer 1308. Input/output program 1346 controls receipt and organization of information from cockpit analog devices 1328. View components of entity participant object 1342 are instantiated in set of view containers 1350, set of view containers 1352 and set of view containers 1354 running on cockpit display computers 1314, 1312 and 1310, respectively. Entity participant object 1342 communicates data to set of view containers 1350, set of view containers 1352 and set of view containers 1354 through data busses 1351, 1353 and 1355, respectively. An operator station is defined as a single logical object comprising multiple computers, displays and input devices. With respect to FIG. 1, an example of an operator station is the grouping of cockpit IO computer 1308, cockpit analog devices 1328 and cockpit display computers 1310, 1312 and 1314.

Figure 2:
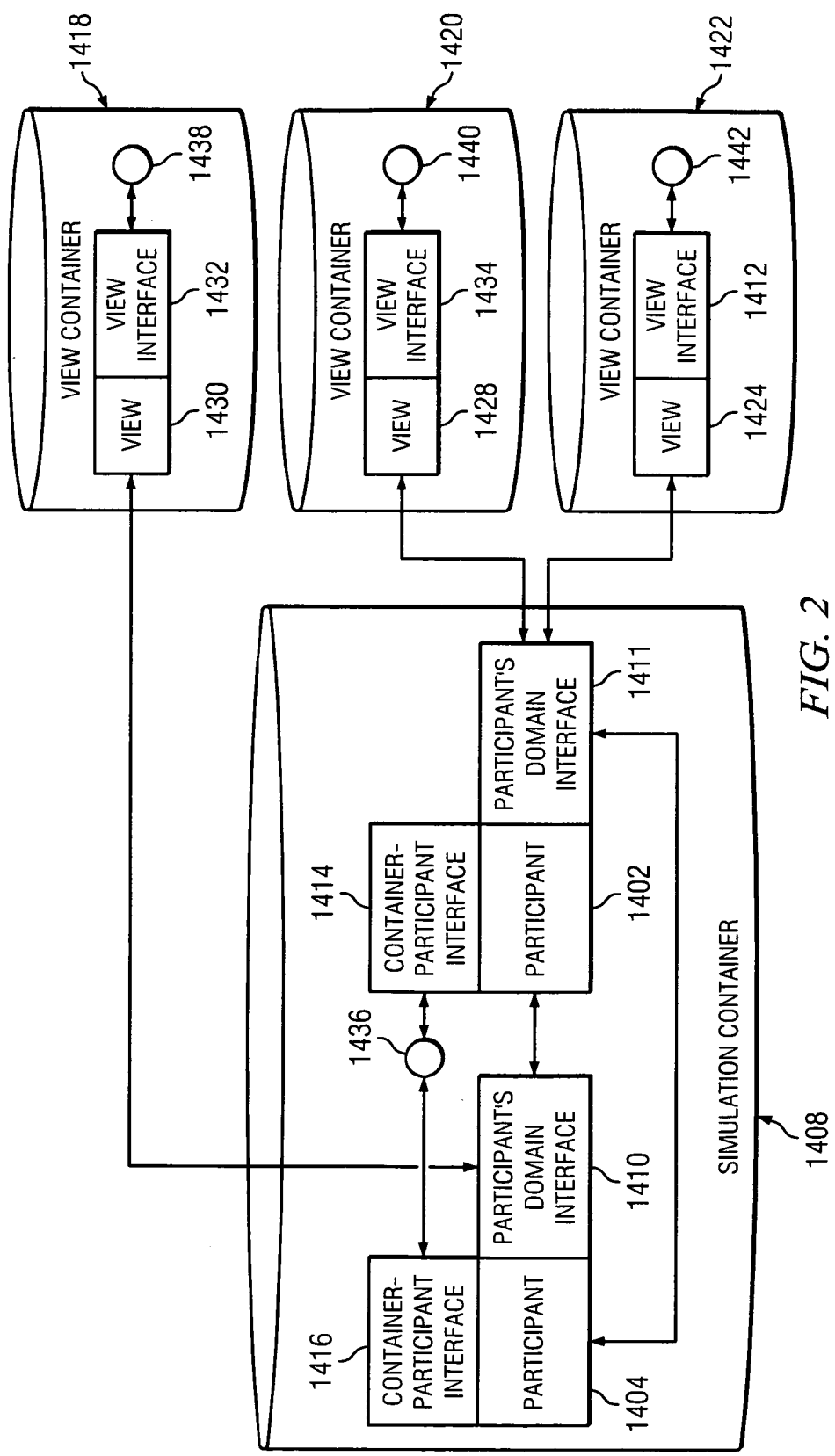
FIG. 2 is a schematic depiction of the logical relationship between participants, interfaces and containers.

Referring to FIG. 2, the logical organization between participant objects, interfaces and containers is shown during run time of the simulation container.

Simulation container 1408 includes participant objects 1404 and 1402. The code for participant object 1402 includes container-participant interface 1414 and participant domain interface 1411. Container-participant interface 1414 includes methods which allow communication of participant object 1402 with simulation container 1408 indicated schematically by connection point 1436. Similarly, participant object 1404 communicates with simulation container 1408 through methods contained in container-participant interface 1416 at connection point 1436. Participant object 1404 also communicates with participant object 1402 through methods defined in participant domain interface 1410 and participant domain interface 1411. Participant domain interfaces 1410 and 1411 define sets of rules that are used by the participant objects to provide information to other participant objects operating in simulation container 1408. Participant domain interfaces 1410 and 1411 are not necessarily predefined but must be consistent between participant object 1402 and participant object 1404 in order to be implemented.

Container-participant interfaces 1416 and 1414 provide methods which participant objects 1404 and 1402, respectively, must implement in order to be instantiated into simulation container 1408.

Each participant object, container-participant interface and participant domain interface also contains methods which instantiate view objects within view containers. Once instantiated, a view object communicates with its originating participant object through an associated participant domain interface. With reference to FIG. 2, participant object 1404 includes code which instantiates view object 1430 within view container 1418. View object 1430 communicates with view container 1418 through view interface 1432, as shown schematically by connection point 1438. View interface 1432 includes methods which are required for instantiation of view object 1430 within view container 1418. In the preferred embodiment, each participant object is capable of instantiating more than one view object in more than one view container.

Continuing with FIG. 2, participant object 1402 includes methods to instantiate view object 1428 within view container 1420 and view object 1424 within view container 1422. Participant object 1402 communicates with view object 1428 and view object 1424 through participant domain interface 1411. View object 1428 communicates with view container 1420 through view interface 1434 shown schematically as connection point 1440. View interface 1434 includes methods which are required to instantiate view object 1428 in view container 1420. View object 1424 communicates with view container 1422 through view interface 1412 as shown schematically by connection point 1442. View interface 1412 includes methods necessary to instantiate view object 1424 in view container 1422.

Figure 3:
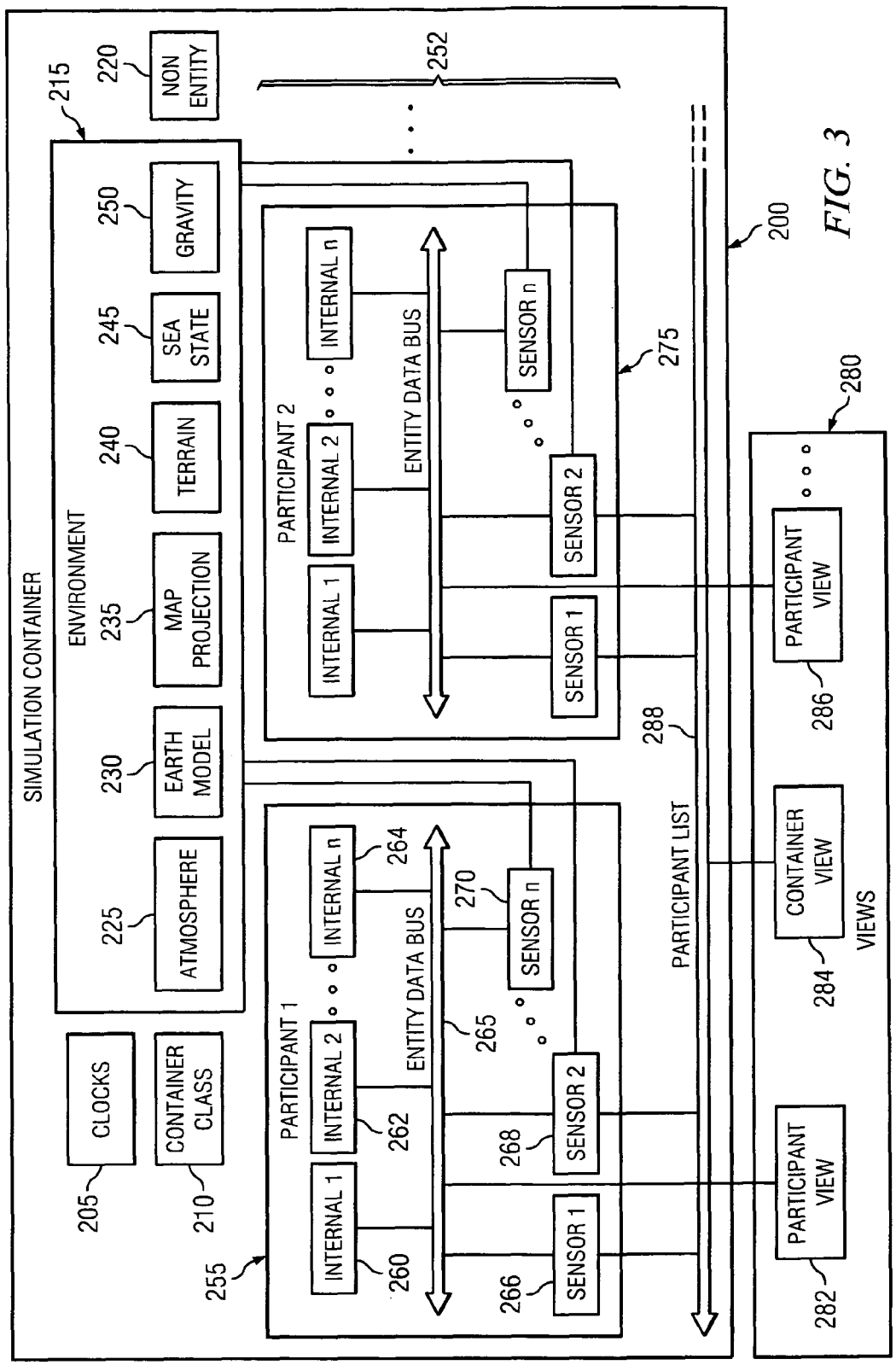
FIG. 3 is a schematic depiction of an example of a simulation container and associated views according to the present invention.

In reference now to FIG. 3, a diagram of an example of one embodiment of an object-oriented simulation container 200 is shown. Simulation container 200 defines an execution context for instances of a simulation participant superclass comprising a set of contained objects 252. The set of contained objects include a plurality of plug-in components that model specific physical concepts and constraints from the simulation problem domain. Simulation container 200 includes two examples of contained objects: participant object 255 and participant object 275. Simulation container 200 provides life-cycle management for participant objects 255 and 275, provides access to a virtual environment 215 in which participant objects 255 and 275 interact within the simulation, and provides general utility services that allow participant objects 255 and 275 to interact with each other and the outside world.

General utility services include a clock service that provides coordination of the simulation clock 205 to all members of the simulation participant superclass, as well as coordination of the master control loop in which multiple instruction pointers to methods of each instantiated participant object in the set of participant objects is repeatedly advanced a single time step in processing. The master control loop controls individual updates of each data bus within each participant object.

General utility services include a routine update service that systematically triggers routine updates to objects and events within simulation container 200 through the master control loop. In the preferred embodiment, routine updates are triggered 60 times a second. In alternate embodiments the updates are triggered at other rates and may be varied on a per scenario basis or dynamically changed based on external commands.

When a routine update trigger is received by a participant object, each participant object method and data bus is updated. Data such as position of the free body in space, velocity and acceleration are calculated and stored in a local database known as a data bus. Object information stored in a participant object's data bus once updated becomes static until the next routine update trigger is received; the object information is available to the set of contained objects and the simulation container.

Simulation container 200 also provides a participant list 288 to enable a general utility service to track the number and identity of each contained object in the set of contained objects including participant objects 255 and 275. The present invention does not place a limit on the number of contained objects and containers that are possible. Therefore, the number of contained objects and containers is only limited by the capacity of the computer system on which the simulation is running.

Simulation container 200 further includes methods to enable list based processing to organize active participants identifiers or handles in an open ended list. Each participant object has write-protected access to the participant list and can access public information about other active participant objects.

Simulation container 200 also maintains categorical lists of the main participant list based on categorization criteria such as class membership, container membership or property evaluation. The categorical lists are updated as participant objects are created and destroyed in the simulation container. For example, an entity participant object such as a ground based radar system may only be designed to report objects which are categorized as air vehicle objects. The simulation container creates and maintains a categorical list of the main participant list which meets a criterion for air vehicle objects. If further entities are created which request access to the categorical list for the same criteria, access is provided by simulation container 200.

Simulation container 200 also provides a general utility service of publishing and subscribing to events known as the publish/subscribe method. Simulation container 200 maintains an "event center" which is a memory location controlled by a method of the simulation container class 210. The event center serves as a "bulletin board" where participant objects can register to be notified when events of interest take place. When an event of interest takes place, the publish/subscribe method of simulation container 200 notifies registered participant objects who in turn calculate the effect of the event and how the event is interpreted.

Simulation container 200 also provides a general utility service of an execution "sandbox." The execution sandbox service enforces method execution as carried out by a participant object to be contained within the participant object's "sandbox" so that any resulting error conditions from the method execution are isolated. For instance, if a participant object encounters a fatal error, the participant object is removed from the simulation container to avoid affecting other participant objects.

Simulation container 200 also provides a "life cycle interface" between the simulation container and participant objects in the set of contained objects. The "life cycle interface" is implemented by container class 210 which controls instantiation of participant objects, error handling and object termination procedures needed for all life cycle management activities. The life cycle interface includes methods for notifying a participant object that it is about to be added or removed from the simulation container or that other participant objects are about to be added or removed from the simulation container. The life cycle interface also includes methods for notifying participant objects that the simulation container is about to terminate operation.

Life cycle termination of an object can be determined by the function of the object. With reference to the set of contained objects 252, times and conditions for specific termination events are calculated by methods within each of the set of contained objects. At a termination event, a participant object communicates to the simulation container through the life cycle interface that the participant object's life cycle has been completed and that the participant object is ready to be terminated. The simulation container responds by terminating the participant object during the next update cycle.

Additionally, life cycle termination proceeds for all of the set of contained objects at a termination of simulation container 200 such as in the occurrence of shutting down the simulation completely or reloading a new simulation. In a simulation container termination, simulation container 200 communicates a potential life cycle termination to the set of contained objects through the life cycle interface. The set of contained objects, through their encapsulated methods, complete their life cycles by closing files and terminating network connections. The simulation container then terminates each participant object of the set of contained objects and updates participant list 288 by removing each associated participant object identifier.

Participant objects in the set of contained objects are designed to represent real-world objects that interact with each other. In the preferred embodiment the participant objects are physical objects or manifestations of physical phenomena, an example of the latter being an electromagnetic wave. Participant objects are controlled by the simulation container containing them and interact with instantiated environment objects in environment class 215 of the simulation container. Participant objects are instantiated and removed by methods within simulation container 200. Participant objects maintain sufficient data and methods to perform functions particular to the participant object as relative to its function within the problem domain and to perform routine updates of memory locations containing data relative to the participant object's function.

When a participant object is created, it registers a set of resources to be used for its representation according to a particular view container class using defined methods in an instantiated view object of the particular view container class. If no resource is defined or available, then that simulation participant cannot be depicted in the instantiated view object.

FIG. 3 further depicts participant object sub-entity objects including internal objects, sensor objects and data bus objects. Sub-entity objects function to coordinate simulation domain data with methods of the participant object. For example, participant object 255 has sub-entity objects including sensor objects: Sensor 266, Sensor 268, Sensor 270, and internal objects: Internal 260, Internal 262, and Internal 264. Sub-entity objects are capable of having methods and other classes logically disposed within them.

In a fractal container-based embodiment as described further below, any of the participant objects and sub-entity objects can be implemented as formal containers nested within one another, each formal container inheriting from a base container class all of its life-cycle management capabilities. Thus, a participant or sub-entity object which is also a formal container can determine its own life cycle completion and terminate itself as required. A top-level runnable container, such as simulation container 200, extends the base container class as container class 210 to manage the overall routine execution loop.

In the preferred embodiment, Sensors 266-270 function in relation to the domain of simulation as collectors of "truth data" that exists within the domain of simulation. Sensors 266-270 gather sensor data from participant objects and environment objects. For example in an aircraft simulation, the "truth data" could be a relative position of one or more targets detected by a radar, the position measured relative to the position of an aircraft free body. In operation, the sensor object gathers sensor data by posting itself as an interested entity on the publish/subscribe list of the simulation container class. The sensor object is then updated as to the presence of events such as target creation and location. A sensor object for a particular participant object may also gather sensor data by accessing the participant list maintained by simulation container 200 or subscribing to events for notification. In the former case, the sensor object determines which other participant objects are available for viewing, then the sensor object presents the sensor data back to the particular participant object through the data bus. In the latter case, sensor data is sent to a sensor object from a set of events by simply subscribing the sensor object as an observer of the set of events.

Examples of sensors depend on the nature of the simulation and the simulation containers. Sensors in the aircraft simulation arena include aircraft radar, aircraft target pods, aircraft weapon pods, aircraft navigation pods, fire control radars, weapon/stores management systems, fuel systems, countermeasure systems, and navigation systems. Of course, examples of sensors can exist outside of the aircraft simulation arena. For instance, sensors in the medical field and industrial fields can be realized with appropriate methods and subclasses to function in an appropriate environment in a time domain. An example is a heart monitor or pressure sensor. Sensors in the botanical field might report presence or absence of rain, ambient light, ambient temperature and the presence or absence of chemical agents.

Internals 260-264 function to produce a modified truth data gathered by sensors 266-270. In the preferred embodiment, internals 260-264 include methods that modify the truth data by filter methods which overestimate or underestimate the truth data to more closely model the physical situation that they represent. For example, in the preferred embodiment although an aircraft radar sensor may reflect truth data of a certain number of enemy surface-to-air missiles, it may be desired for the simulation aircraft's radar system to display less than the total number, thereby artificially indicating fewer threats to the aircraft participant. Modified truth data is communicated to the participant through updates to the data bus.

Simulation container 200 also includes an environment class 215. Environment class 215 operates as an object within simulation container 200 along with environment objects which provide methods, functions and constants grouped in related physical objects. In one embodiment, objects of environment class 215 operate as an atmosphere 225, an earth model 230, a map projection 235, terrain 240, a model of the sea state 245 and gravity object 250. The environment objects remain a part of the simulation container 200 for the duration life-cycle of the specific simulation. Each of the environment objects of the environment class can of course contain finer grained aggregations. For instance, gravity object 250 can merely be a constant such as 9.8 m/s$^2$. However, gravity object 250 can also include a lookup table varying gravity relative to position or altitude with respect to earth model object 230 and/or other static and dynamic factors related to a time or space domain.

Environment objects act as services that provide data to participant objects and their sensors upon request. Environment objects update their specific object properties upon receipt of a routine update trigger provided by the simulation container. The environment objects may be modified in appearance or number during a simulation and also may be replaced or removed. However, at least one environment object must be instantiated in the environment class. Environment objects may change over time or with respect to spatial coordinates or composition. For example, the characteristics of the atmosphere 225 may change as a function of time of day and the terrain 240 may change due to the resultant detonation of a munition explosion from a dropped ordnance from a simulation aircraft or other participant.

The present invention is not limited to environment objects specifically relating to an aircraft simulation. Examples of environment classes are conceived to model physical properties of a nano-machine environment, a medical environment, and a horticulture environment. The alternative environment objects should have functions and variables that define environment specific types that can be updated, queried and utilized by participant objects and sub-entities operating within simulation container 200.

Each participant communicates internally through data bus 265. Data bus 265 is an intra-entity data memory block that centralizes internal data needed for operation of the participant object. The data bus is encapsulated in the participant class but may be mirrored to support other participant objects' needs. For example, the data bus is used to support view objects outside of simulation container 200. In this example, a set of multi-function display interfaces running on a computer outside of simulation container 200 can communicate with sensor objects that feed information to a set of view objects via participant object data buses running inside simulation container 200.

Simulation container 200 also includes non-entity objects 220. Non-entity objects 220 drive external physical functions of the simulation and communicate with hardware drivers that in turn communicate with hardware devices. The non-entity objects have attributes which identify external devices and methods, which prepare and time data for transmission to external devices and methods, and which interpret and translate data received from external devices. Non-entity objects also coordinate certain simulation functions such as scenario control. Examples of non-entity objects include controllers for external devices such as image generators, audio generators and scripting engines. Scripting engines are lists of instructions or methods which are repeated actions to be taken by various participants and environment objects to create a situation or scenario.

Another example of a non-entity object is a bridge participant. A bridge participant is an interface to a public network protocol such as the Distributed Interactive Simulation (DIS) protocol (IEEE 1278.1 and 1278.1a and all future amendments). The DIS protocol provides communication between simulators who have adopted the protocol.

FIG. 3 also depicts views container 280 including participant view object 282, container view object 284 and participant view object 286. Container view object 284 shows information about the entire simulation container while participant objects 282 and 286, show information about single participant objects within the simulation container. The number of view objects that can simultaneously interact with a given simulation container and a given set of participant objects are restricted only by available network bandwidth, and the rate at which participant objects in the container prepare, send, and receive data. Participant view object 282 provides the graphics generation attributes and methods to depict dynamic information of participant object 255, such as location, through a graphical participant interface. Similarly, participant view object 286 is responsible for depicting the activity and interactions of participant object 275 in a simulation running within simulation container 200. In the preferred embodiment, each participant object in the set of contained objects 252 can have zero or more associated participant view objects located within views container 280. The preferred embodiment prescribes no limit to the number of participant views for each participant.

Container view object 284 provides methods and attributes to display a graphical depiction of the activities of all participant objects participating in the simulation which are simultaneously registered on participant list 288.

Figure 4:
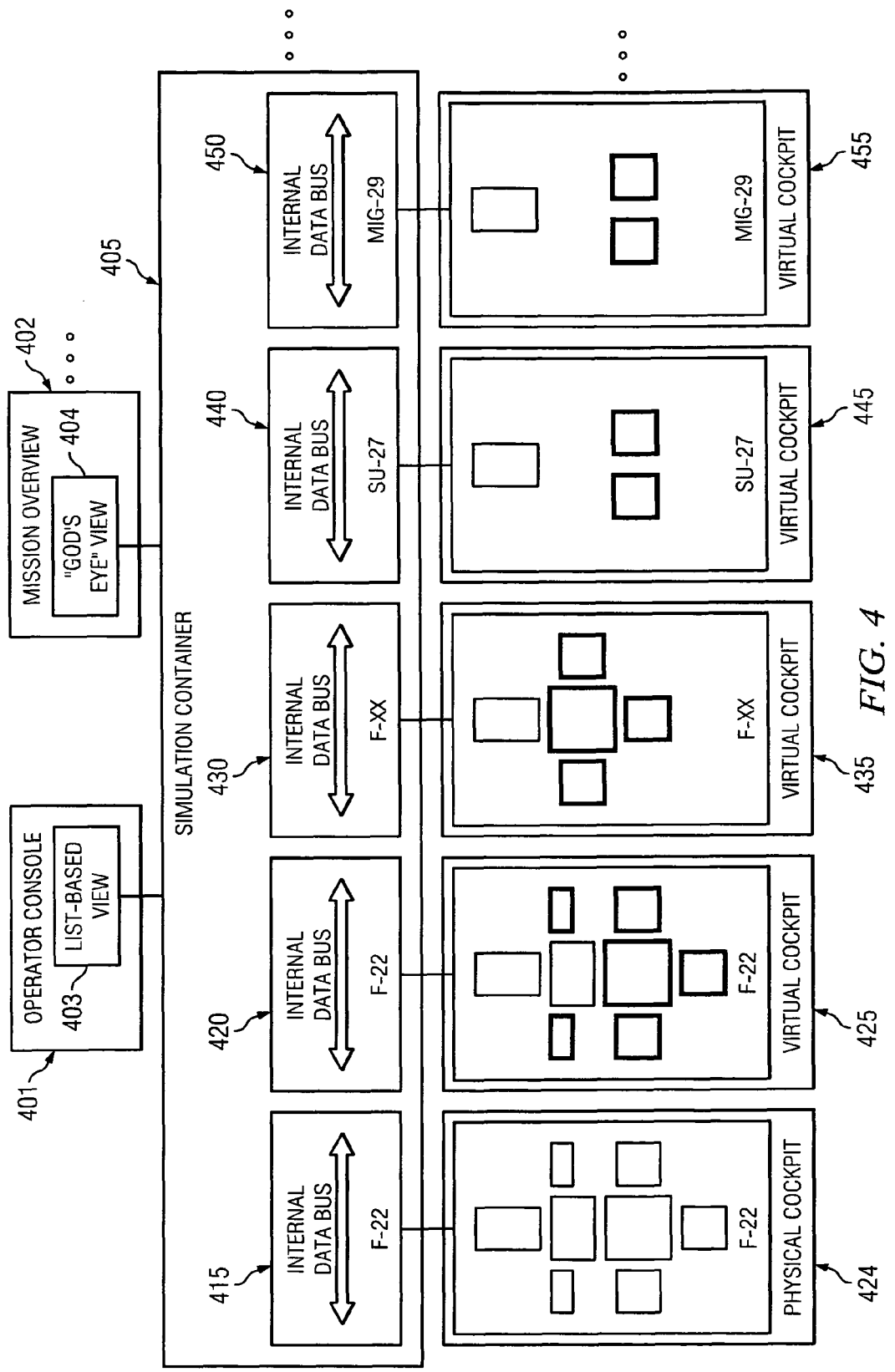
FIG. 4 is a schematic depiction of multiple view objects in communication with a simulation container.

FIG. 4 shows four types of views applications operating in communication with simulation container 405; the operator console container 401; the mission overview container 402; a plurality of virtual cockpit views 425, 435, 445, and 455 and a physical cockpit view 424 each in communication with simulation container 405.

In the preferred embodiment, the virtual cockpit views and physical cockpit views are containers for the display set of a single entity. Multiple virtual cockpits views 425, 435, 445, and 455, and physical cockpit view 424 can be active simultaneously, thereby providing a built-in manned control station and display repeater capability. Examples of display sets are shown for an F-22 415 and 420, F-XX 430, SU-27 440, and a MIG-29 450. Each participant can provide an optional display set that defines the graphical presentation of its views. For example, an aircraft entity, such as an F-22 420, may provide views of the various cockpit displays such as virtual bezels, panels, and functional displays.

Figure 5:
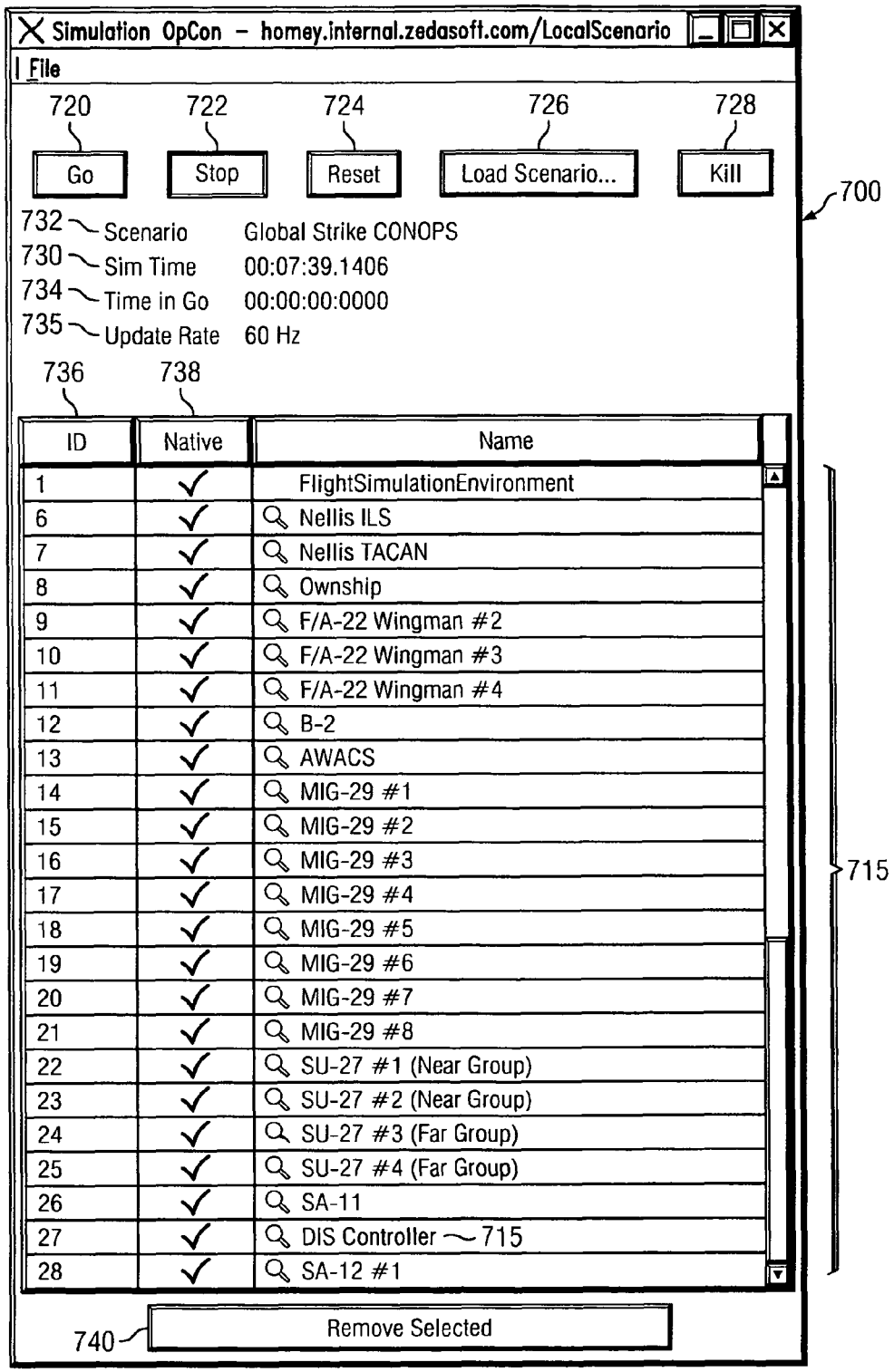
FIG. 5 is a display representation of an operator console view.

FIG. 5 depicts operator console view 700 generated by the operator console container. Textual identifiers for both non-entity objects and entity objects are displayed in numbered rows 715. The operator console view allows control of the simulation through an activation of "go" button 720. Similarly, stop button 722 allows pausing of the simulation. Button 724 provides a "reset" function which starts the scenario from the beginning without loading a scenario or the associated scripts. However, if a new scenario is to be loaded, button 726 is provided which invokes the scripts for a new scenario to be loaded into memory. Kill button 728 is provided which allows termination of the simulation container to which the operator console is attached.

Line 730 provides a simulation time indicator, which is a display of the simulation clock provided to indicate to the various scripts and control objects the total time the attached simulation container has been running.

At 732, a scenario name designation is provided. At line 734, an indication of how long the simulation has been in operation is provided. The number of times per second that each object is updated is provided in cycles per second at line 735.

Column 736 provides an identification number arbitrarily assigned to the various entities and non-entities determined by the time they were added to the simulation. Column 738 indicates whether the object listed is native to the simulation container or whether it has been imported from a separate container outside the simulation through a network connection.

Examples of entity objects can be seen at rows 8 through 25 identified as various types of aircraft in numbered rows 715. Examples of ground site entity objects are rows 6, 7, 26 and 28 of numbered rows 715. Examples of a non-entity object listed on the operator console view is shown as the flight simulator environment at row 1 and DIS controller at row 27 of numbered rows 715. At button 740, functionality is provided to eliminate participants from the simulation which has been selected by the operator.

In operation, the operator console view 700 provides a displayed list of the set of contained objects running within a simulation container. The operator can scroll through a textual list of participant objects which in turn accesses attributes and methods in the participant objects that are participating in the simulation through inspector panels. Inspector panels are generated by the operator console container by application of the data supplied by each participant object as supplied through the appropriate plug-in. In the preferred embodiment, an inspector panel is provided by a participant plug-in. A participant plug-in includes the ability to alter or make inoperable a list of components. For example a participant plug-in can alter or make inoperable a set of aircraft parts such as aircraft control surfaces, engines, hydraulic systems, navigation systems, landing gear, electrical systems, mechanical systems, weapons delivery systems, and fuel management systems. Each participant object and participant plug-in defines the interfaces that let operators interact with entities of the participant object's class. These interfaces are made available via either an operator console (for changing properties during a running simulation), or a scenario generator (for changing properties of the static picture of the simulation missions). Of course, each type of participant object can provide a unique inspector panel plug-in design to allow modification of attributes of that participant object.

Additional details of the system and methods of container-based architecture for simulation are provided in U.S. application Ser. No. 12/378,905 filed Feb. 20, 2009 which is hereby incorporated by reference.

In another embodiment of the container-based architecture, a fractal containment framework is implemented comprising a set of life-cycle containers wherein a life-cycle container has all life cycle management capabilities of a formal simulation container. A life-cycle container includes a set of contained objects and is itself a contained object in a parent life-cycle container, unless it is the topmost life-cycle container in a hierarchy.

In the fractal containment framework, contained objects are named and uniquely identifiable and can be concatenated together to specify an object graph. During runtime, the life-cycle container allows its contained objects to identify themselves, acts on communications from its contained objects as to structural changes including addition and removal, and manages the routine execution of the methods of contained objects. Also at runtime, contained objects discover their surroundings including their parent life-cycle container and sibling contained objects. Contained objects run in an execution sandbox that protects the object graph from misbehavior during execution. If an offending contained object enters an undesirable state then the offending contained object is discarded and the rest of the object graph continues its execution normally.

Figure 6:
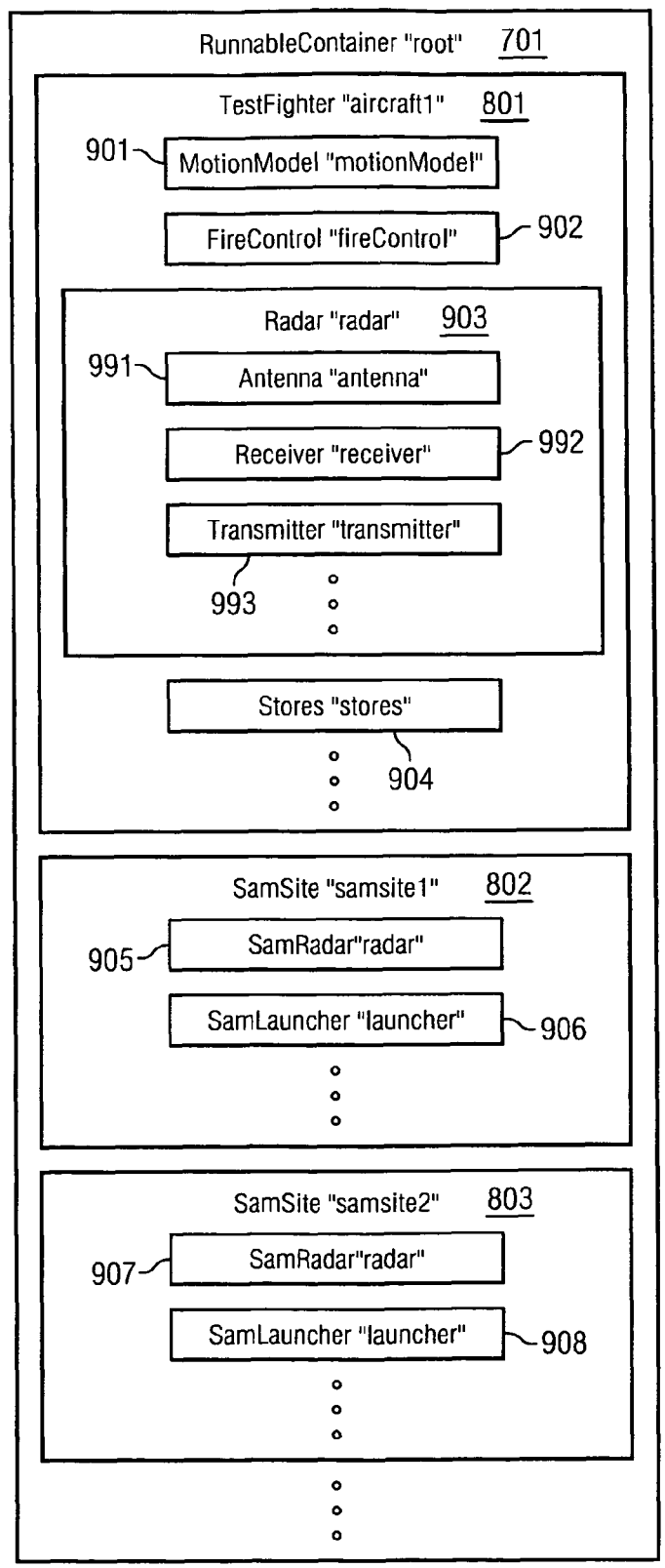
FIG. 6 is a depiction of a fractal container in a fractal container-based architecture.

Referring to FIG. 6, life-cycle container 701 is an example of a runnable life-cycle container named "root," depicting that life-cycle container 701 is the uppermost level container in a hierarchy of containers. Test fighter object 801, SAM site object 802 and SAM site object 803 are contained objects within life-cycle container 701 representing a set of systems at the same peer level. Test fighter object 801 implements a life-cycle container containing internal subsystems including motion model object 901, fire control object 902, radar object 903 and weapon object 904. Radar object 903 is a life-cycle container containing antenna object 991, receiver object 992 and transmitter object 993. SAM radar 905 and SAM launcher 906 are immediate contained objects in SAM site object 802, which is also a life-cycle container. Likewise, SAM radar 907 and SAM launcher 908 are immediate contained objects in SAM site container 803, which is also a life-cycle container. All contained objects are associated with identifiable names shown in quotes.

Figure 7:
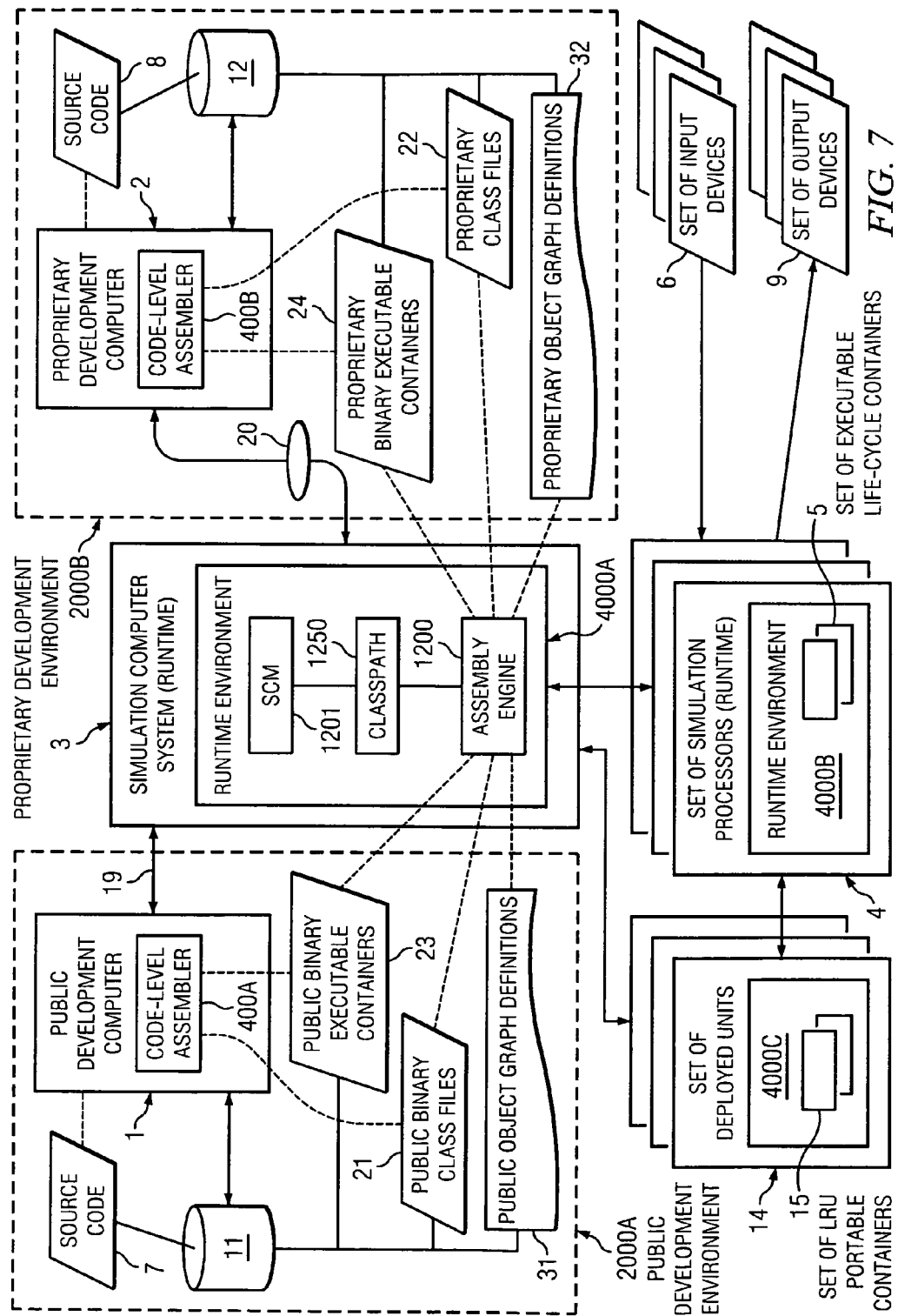
FIG. 7 is a schematic diagram of the development and runtime environments of a fractal containment framework.

An exemplary hardware embodiment of the fractal container architecture is shown in FIG. 7 comprising development environment 2000A, development environment 2000B and runtime environment 4000A. Additional runtime environments 4000B and 4000C are also included to perform simulations and operate deployed LRU subsystems, respectively. A set of input devices 8 and set of output devices 9 interact with runtime environment during simulation.

In development environment 2000A, public computer system 1 is configured to produce and store source code 7 which includes a set of interfaces, and a set of public implementations comprising a set of binary class files 21 and a set of binary executable containers 23. Public computer system 1 has a storage system 11 attached for storing source code 7, binary class files 21, binary executable containers 23 and public object graph definitions 31. Public computer system 1 includes a compiler 400A suitable to build binary class files 21 and binary executable containers 23 from source code 7. Binary class files 21 area a set of uninstantiated classes that encapsulate the set of public implementations according to the set of interfaces. Binary executable containers 23 are a set of uninstantiated containers and classes that encapsulate public implementations of container objects and are executable in a runtime environment.

In development environment 2000B, proprietary computer system 2 is configured to produce and store source code 8 which includes a set of interfaces, and set of proprietary implementations comprising a set of binary class files 22 and a set of binary executable containers 24. Proprietary computer system 2 has a storage system 12 attached for storing source code 8, binary class files 22, binary executable containers 24 and proprietary object graph definitions 32. Proprietary computer system 2 includes a compiler 400B suitable to build binary class files 22 and binary executable containers 24 from source code 8. Binary class files 22 are a set of uninstantiated classes that encapsule a set of proprietary implementations according to the set of interfaces. Binary executable containers 24 are a set of uninstantiated containers and classes that encapsulate a set of proprietary implementations and are executable in a runtime environment.

A simulation computer system 3 comprises runtime environment 4000A which further comprises software component manager SCM 1201, assembly engine 1200 and classpath 1250. Simulation computer system 3 is in communication with public computer system 1 via communication link 19 and proprietary computer system 2 via encrypted communications link 20. Classpath 1250 includes path information for public binary class files 21, proprietary binary class files 22, public binary executable containers 23 and proprietary binary executable containers 24. Assembly engine 1200 is configured to construct and aggregate public contained objects and proprietary contained objects into a set of executable life-cycle containers 5 according to classpath 1250 and one or both of public object graph definitions 31 and the proprietary object graph definitions 32. The binary executable containers are runnable life-cycle containers or lower-level containers suitable to be injected into an object graph by assembly engine 1200. Assembly engine 1200 is also configured to compile a set of LRU portable containers 15 suitable for execution on a set of field deployable LRU subsystems 14.

Binary class files 22, binary executable containers 24 and proprietary object definitions 32 can be encrypted as stored and transferred between systems so that the information encapsulated in these files is not discoverable without decryption apparatus included in assembly engine 1200.

In an important embodiment of the present invention, the simulation system is configured to handle government classified versions of binary class files 22 and classified proprietary object definitions 32.

A set of simulation processors 4 are in communication with simulation computer system 3, set of input devices 6 and set of output devices 9. The runtime environment is extended to runtime environment 4000B on a set of simulation processors 4 programmed to carry out life-cycle execution of the set of executable life-cycle containers 5 as a simulation. Human interaction with the simulation is accomplished using set of input devices 6 and set of output devices 9. Examples of input devices include a keyboard, a mouse, a joystick and a purpose built simulator hardware such as an aircraft cockpit with cockpit controls. Examples of output devices include a display monitor, audio speakers and a purpose built simulator hardware such as an aircraft cockpit with cockpit gauges and a heads-up display. An embodiment of runtime environment 4000B suitable for the set of simulation processors has been described in relation to FIGS. 1-3.

A set of field deployed LRU subsystems 14 each include a set of processors that implement runtime environment 4000C programmed to execute the life-cycle of set of LRU portable containers 15 and their contained objects. In stand-alone situations the set of field deployed LRU subsystems 14 directly execute the set of LRU portable containers 15 in runtime environment 4000C without interaction with simulation computer system 3. In more complex situations, the set of field deployed LRU subsystems 14 are in communications with simulation computer system 3 in a combination simulation and real-time operation where the set of LRU portable containers 15 are executed in runtime environment 4000C simultaneous to life-cycle containers being executed in runtime environment 4000A or 4000B.

In the preferred embodiment, runtime environments 4000A, 4000B and 4000C are the Java runtime environment. The development environments 2000A and 2000B include the Java development environment operating on their respective computer systems. Projects are built and stored into Java .jar files. Interfaces are defined according to Java specifications and implemented within Java classes. Java classes are compiled as binary class files. When instantiated as objects, implementation methods defined in the Java classes allow objects to interface with other objects according to the set of interfaces. Within the context of Java and the preferred embodiment, a component corresponds to a class file. Instantiation of objects results from assembling one or more Java class files into a set of contained objects in an object graph and populating the set of contained objects with property values. While Java provides a natural means to implement the embodiments of the present invention, the foregoing embodiments can be implemented in any suitable object-oriented language.

Many different embodiments of the set of simulation processors are possible. For example, each simulation processor can be a separate computer system in communication with the simulation computer system 3. In another example, each simulation processor can be instantiated as a thread executing on at least one processor included in the hardware of simulation computer system 3. In another example, the set of simulation processors includes a single simulation processor executing a single top-level life-cycle container to manage the life cycles of contained objects within the life-cycle container. In yet another example, each simulation processor of the set of simulation processors is configured to run within a dedicated virtual operating system on a single computer system.

The hardware implementation of FIG. 7 and descriptions thereof are intended to be exemplary only. The proprietary computer, public computer and simulation computer system all contain processors, memory and persistent storage capable of executing coded instructions and further capable of user interface through a display, keyboard and mouse to operate the various embodiments of the fractal containment architecture. Some embodiments require a database which can be implemented in one or more of the development computers and simulation computer. In some implementations, multiple public or multiple proprietary computers are required while in other implementations, multiple simulation computer systems operate simultaneously. In many embodiments, only the public development environment and runtime environment are required.

Figure 8:
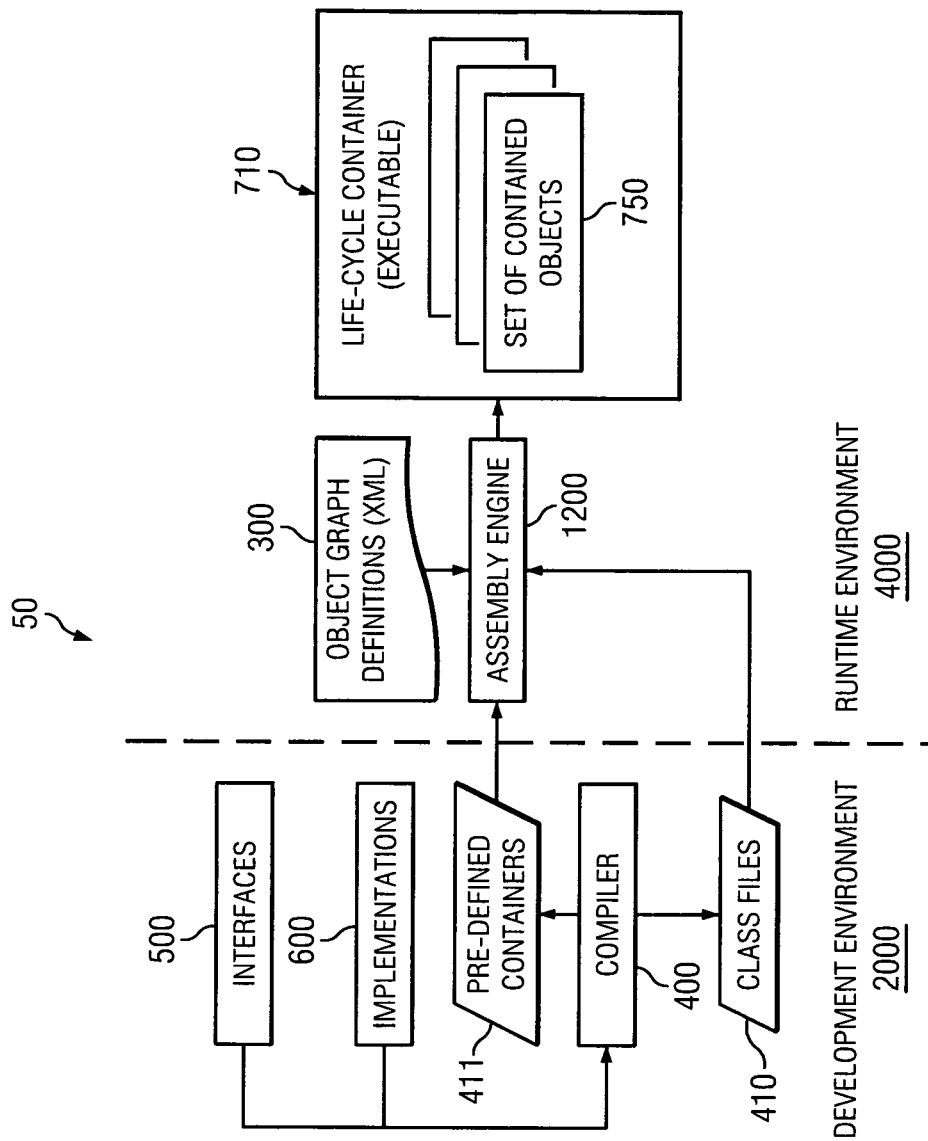
FIG. 8 is a depiction of the general process for assembling a life-cycle container in a fractal containment framework using interfaces, implementations and an object graph description.

Beginning with FIG. 8, exemplary embodiments of fractal containment frameworks are now described. A fractal containment framework 50 allows a life cycle container 710 to implement an executable object graph using a set of contained objects 750. Life cycle container 710 is assembled from a set of predefined container classes 411, a set of class files 410 and at least one object graph description 300. Fractal containment framework 50 includes development environment 2000 and runtime environment 4000.

Set of interfaces 500 define a domain model for the set of contained objects. Each interface specifies methods that must be implemented for each contained object. Furthermore, the set of interfaces 500 define a "contract" between contained objects defining how they interact with one another and with life-cycle container 710. For example, an interface for life cycle container 710 is specified by a container class interface within set of interfaces 500.

Set of implementations 600 specify runtime behaviors of the set of interfaces 500 defining all methods and attributes necessary to instantiate the set of contained objects at runtime. There is at least one implementation defined for each interface. When more than one implementation is defined for an interface, the multiple implementations can be selectively interchanged, depending on the simulation needs. For example, multiple implementations of a given interface can provide varying levels of fidelity, accommodate export restrictions, change classification levels, and accommodate general experimentation. Set of implementations 600 and set of interfaces 500 exist in development environment 2000 as source code from which class files 410 are compiled by compiler 400 and made available for assembly into object graphs during runtime. Compiler 400 also compiles predefined container classes 411 using a container class interface and a set of container class implementations.

In runtime environment 4000, assembly engine 1200 instantiates set of contained objects 750, initializes the set of contained objects, and then puts the set of contained objects together into life-cycle container 710 as an executable object graph. Any combination of class files 410 and predefined container classes 411 are selectively included in the set of contained objects 750 by specifying required elements and initial property values in the object graph description 300. In the preferred embodiment, object graph description 300 is an XML document. A hierarchical object graph structure is described in XML syntax as assembly instructions for assembly engine 1200 (see also FIG. 12). The executable object graph implemented by life-cycle container 710 has no inherent complexity limit allowing for an arbitrary number of containers and contained objects, nested as deeply as necessary to accomplish a simulation.

In operation, life cycle container 710 regulates the routine execution of the set of contained objects 750. Furthermore, life cycle container 710 coordinates a formal initialization phase between object assembly and routine execution. During the formal initialization phase, initial property values of contained objects are set and methods of contained objects are executed to discover the simulation environment.

In a high-fidelity military simulation (or a proprietary business application), a mechanism is provided to implement at least some components whose code and data are classified by a government entity (or considered proprietary to a corporation). Unclassified and non-proprietary implementations are generally designated within a "white world." Classified and proprietary implementations are generally designated within a "closed world."

Figure 9:
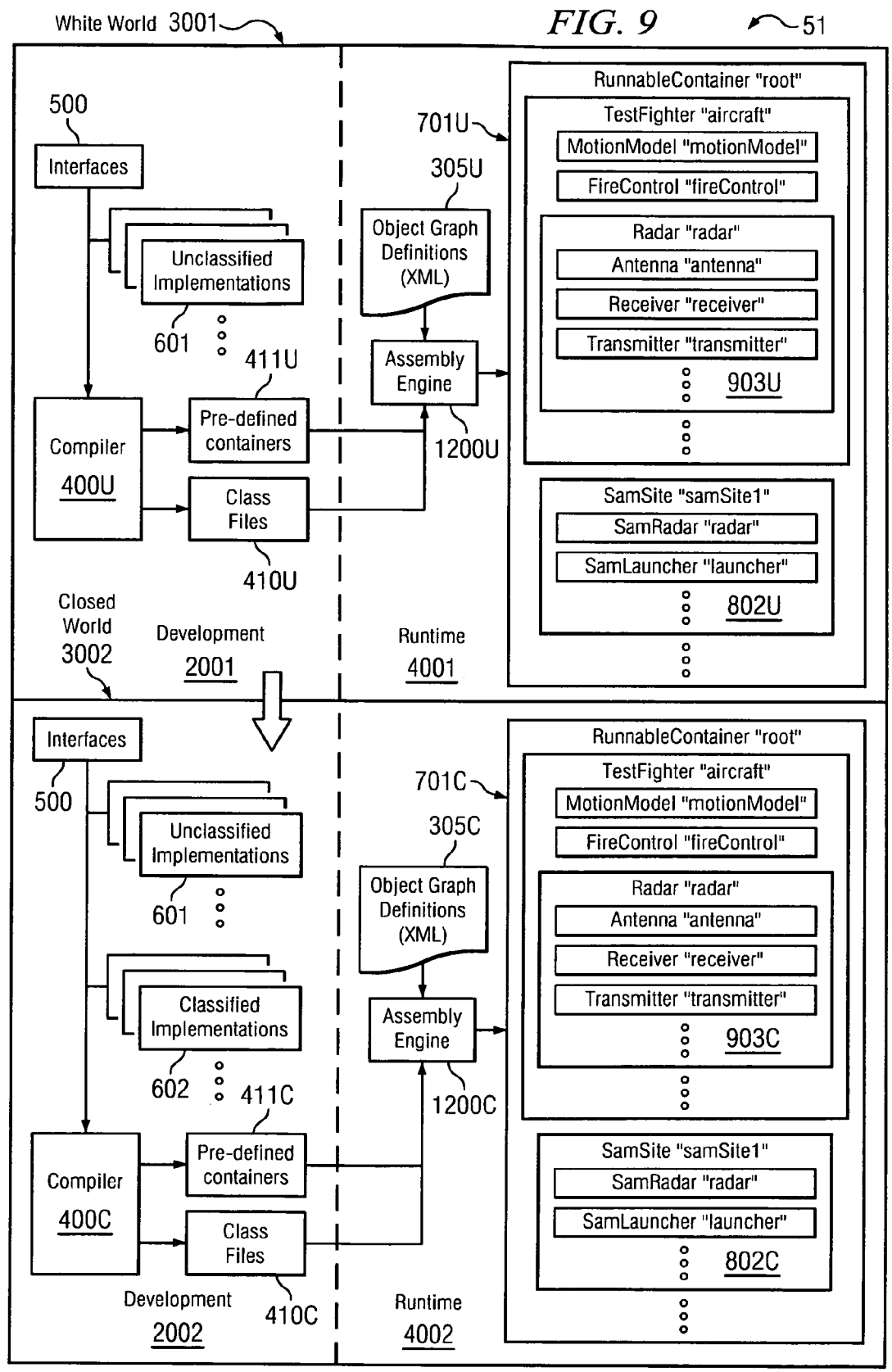
FIG. 9 is a schematic of the fractal containment framework using unclassified implementations and classified implementations.

FIG. 9 shows a hybrid fractal containment framework 51 for developing and instantiating executable object graphs from classified implementations alongside unclassified implementations. In the description that follows, FIG. 9 is described in relation to a government oriented project using the descriptive terms "classified" and "unclassified." The description is equally applicable to any project with proprietary and public aspects by substituting the term "proprietary" for "classified" and the term "non-proprietary" for "unclassified."

White world 3001 includes a development environment 2001 and a runtime environment 4001. Development environment 2001 comprises a set of interfaces 500, a set of unclassified implementations 601 and a compiler 400U for compiling a set of predefined container classes 411U and a set of class files 410U from the set of interfaces and the set of unclassified implementations. Runtime environment 4001 comprises assembly engine 1200U, an unclassified object graph description 305U and a life-cycle container 701U assembled by assembly engine 1200U from the unclassified object graph description, set of class files 410U and set of predefined container classes 411U.

Closed world 3002 includes a development environment 2002 and a runtime environment 4002. Development environment 2002 includes the set of interfaces 500 and the set of unclassified implementations 601 and further comprises a set of classified implementations 602, a compiler 400C for compiling a set of predefined container classes 411C and a set of class files 410C from the set of interfaces, the set of unclassified implementations and the set of classified implementations. Runtime environment 4002 comprises assembly engine 1200C, a classified object graph description 305C and a life-cycle container 701C assembled by assembly engine 1200C from the classified object graph description, set of class files 410C and set of predefined container classes 411C.

Fractal containment framework 51 is configured to allow unclassified elements to be assembled and tested outside closed world 3002 so the core system can be maintained from a common code line. In closed world 3002, a selection of unclassified elements in the set of unclassified implementations 601 are replaced with classified counterpart elements in the set of classified implementations 602. Assembly is brought together declaratively at runtime in runtime environment 4002, where the sets of unclassified and classified implementations can be made to define a subsystem, a deployable unit, and/or a scenario involving multiple subsystems and deployable units. The set of classified implementations can define any combination of entire platforms, platform subsystems, or sub-components of subsystems.

In white world 3001, unclassified object graph description 305U specifies a selection of unclassified elements. In closed world 3002, classified object graph description 305C specifies a selection of mixed elements from the set of unclassified implementations 601 and the set of classified implementations 602. For example, a simulation user can maintain a runnable, unclassified system in white world 3001, and deploy that entire system into closed world 3002 when new classified features are available. Both white world 3001 and closed world 3002 have the same set of interfaces 500. Implementations can be selected and exchanged freely at runtime. However, life-cycle container 701U is an executable entity in both the white world and in the closed world while life-cycle container 701C is an executable entity only in the closed world.

As an example, a classified aircraft radar container 903C and a classified SAM site model container 802C in runnable life-cycle container 701C are maintained in closed world 3002 and defined using classified elements and data. Unclassified radar container 903U and unclassified SAM site model container 802U are maintained in white world 3001 in runnable life-cycle container 701U and defined using unclassified components and data.

Figure 10:
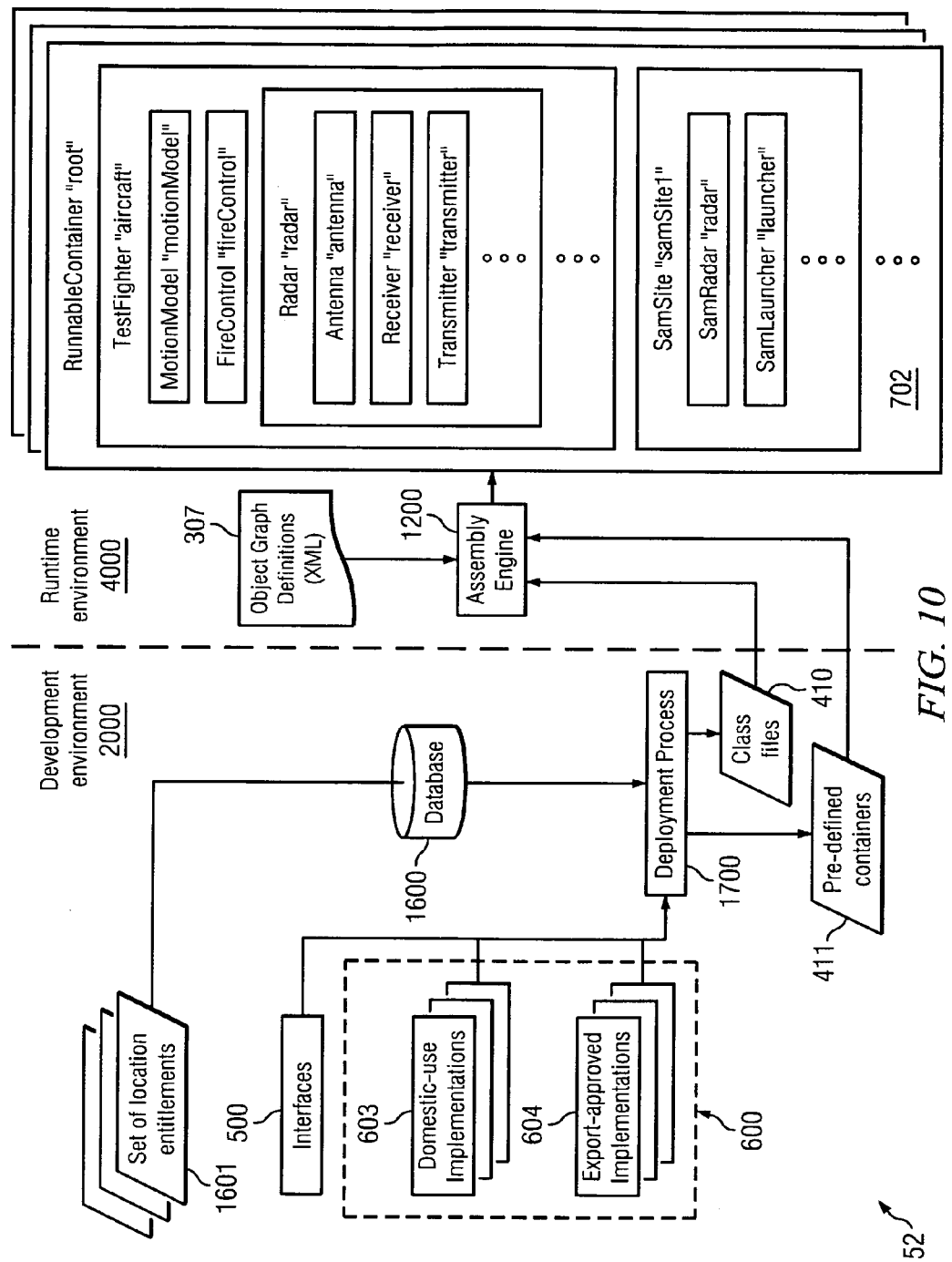
FIG. 10 is a schematic of the fractal containment framework using domestic use implementations or export-approved implementations.

Referring to FIG. 10, fractal container framework 52 is configured to drive international deployments of simulation systems. Development environment 2000 includes a set of interfaces 500 defining a set of contained objects, a set of implementations 600 defining behaviors for the set of contained objects, a set of predefined container classes 411 and a set of class files 410 from the set of implementations. Set of implementations 600 includes export-approved implementations 604 and domestic-use implementations 603. Database 1600 includes a set of deployment location entitlements 1601 and interacts with deployment process 1700 to allow for selection of implementations. Set of interfaces 500 are commonly defined for the set of implementations 600 regardless of approval for export: export-approved implementations and domestic use implementations are freely interchangeable from a functional perspective. Further, this framework assumes that domestic-use implementations 603 and export-approved implementations 604 use identical class names.

In runtime environment 4000, assembly engine 1200 is configured to instantiate contained objects, initialize the contained objects, and then put the contained objects together into a set of life-cycle containers 702 as executable object graphs corresponding to the set of deployment locations.

In operation, deployment process 1700 selects implementations based on set of deployment location entitlements 1601 in database 1600. Deployment process 1700 selects set of class files 410 and set of predefined container classes 411 available for each deployment location by selecting implementations from export-approved implementations 604, domestic use implementations 603 and combinations thereof. A combination of class files 410 and predefined container classes 411 is selectively included in a life-cycle container by specifying required elements and initial property values in the object graph description 307.

The runtime assembly of the set of life-cycle containers 702 is directed by assembly engine 1200. Object graph description 307 is loaded into assembly engine 1200 to create the set of life-cycle containers 702. Each life cycle container, in set of life cycle containers 702, regulates the routine selection and execution of its set of contained objects during runtime according to domestic-use, export-approved use and deployed location.

Figure 11:
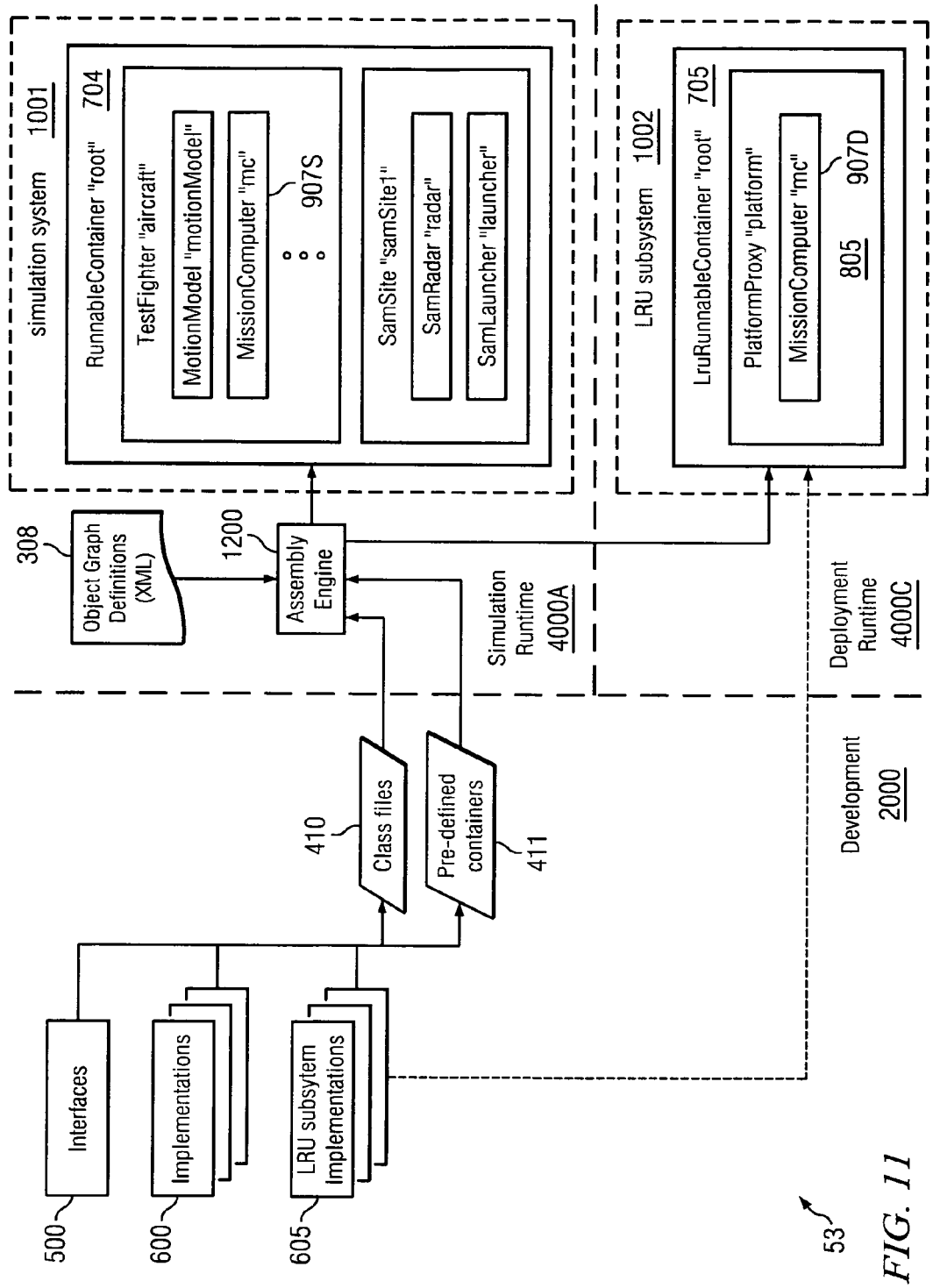
FIG. 11 is a schematic of the fractal containment framework using a mission computer implementation in a deployment environment on a physical platform.

In military equipment platforms, a line replaceable unit (LRU) is an essential physical subsystem which is removed and replaced at the field level to restore a host platform to an operational ready condition. Referring to FIG. 11, fractal containment framework 53 enables the development and execution of life-cycle containers as LRU portable containers in a simulator system and the transfer of LRU portable containers to an LRU subsystem on a field deployed platform.

In the simulated runtime environment 4000A, a runnable life-cycle container 704 includes an encapsulated LRU portable container 907S that interacts with a simulation system 1001. Simulation system 1001 includes a set of simulation processors that execute the life-cycle container 704.

In the real-world deployment environment 4000C, a runnable LRU life-cycle container 705 includes an encapsulated LRU portable container 907D available to LRU subsystem 1002 for control of real-time operations. LRU subsystem 1002 includes a set of LRU processors that execute the LRU life-cycle container 705.

Simulation system 1001 and LRU subsystem 1002 each surround an LRU portable container with appropriate parent containers that act as a bridge between the LRU portable container and whatever environment it finds itself in. The end result is that the LRU portable container only interacts through its predefined interface to the outside world, but does not know what entity is providing that interface, be it the simulation system or a field deployed LRU subsystem.

Continuing with FIG. 11, a mission computer implementation provides an example LRU portable container. In practice, an arbitrary number of LRU portable containers can be included in multiple LRU subsystems in the real-world deployment runtime environment. Aircraft, for example, usually contain between about 10 and about 50 LRU subsystems while a ship can contain multiple hundreds of LRU subsystems, depending upon the size and complexity of the ship.

Development environment 2000 includes a set of interfaces 500 defining a set of components, a set of implementations 600 defining behaviors for the set of components, a set of LRU subsystem implementations 605 defining behaviors for the LRU life-cycle container and the LRU portable containers. Implementations 600 and LRU subsystem implementations 605 include a set of class files 410 and predefined container classes 411 which are dynamically assembled in the simulation runtime environment.

Any combination of class files 410 and predefined container classes 411 are selected for inclusion in a runnable life cycle container by specifying required elements and initial property values in the object graph description 308. In simulation runtime environment 4000A, assembly engine 1200 instantiates contained objects from the required components, initializes the contained objects including all LRU portable containers, and then puts the contained objects together into runnable life-cycle container 704 for the simulation system and into runnable LRU life-cycle container 705 for the LRU subsystem.

In practice, a systems integration lab would involve a combination of the simulation runtime environment and deployment runtime environment. Each of these system integration labs would host a life-cycle container in an overall hierarchy of life-cycle containers such that a proper execution environment for set of LRU subsystem implementations 605 could be established. Provided the execution environments are comprehensive, LRU subsystem implementations 605 plug into multiple deployed runtime environments without modification from the simulation runtime environment.

A combination simulation runtime environment and deployment runtime environment is also conceived wherein life-cycle container 704 in the runtime simulation environment assists LRU life-cycle container 705 in the deployment environment during actual deployment operations based on simulation efforts.

In another embodiment, a set of operational program codes for the LRU subsystem unit is declared within the set of graph object descriptions 308 and assembled together with the mission computer implementation into LRU life-cycle container 705 and LRU portable container 907D. In operation, the LRU life-cycle container 705 is configured to perform a repeatable and selective load of an operation program code from the set of operational program codes. An example of an operational program code is an operational flight program for an aircraft.

Figure 12:
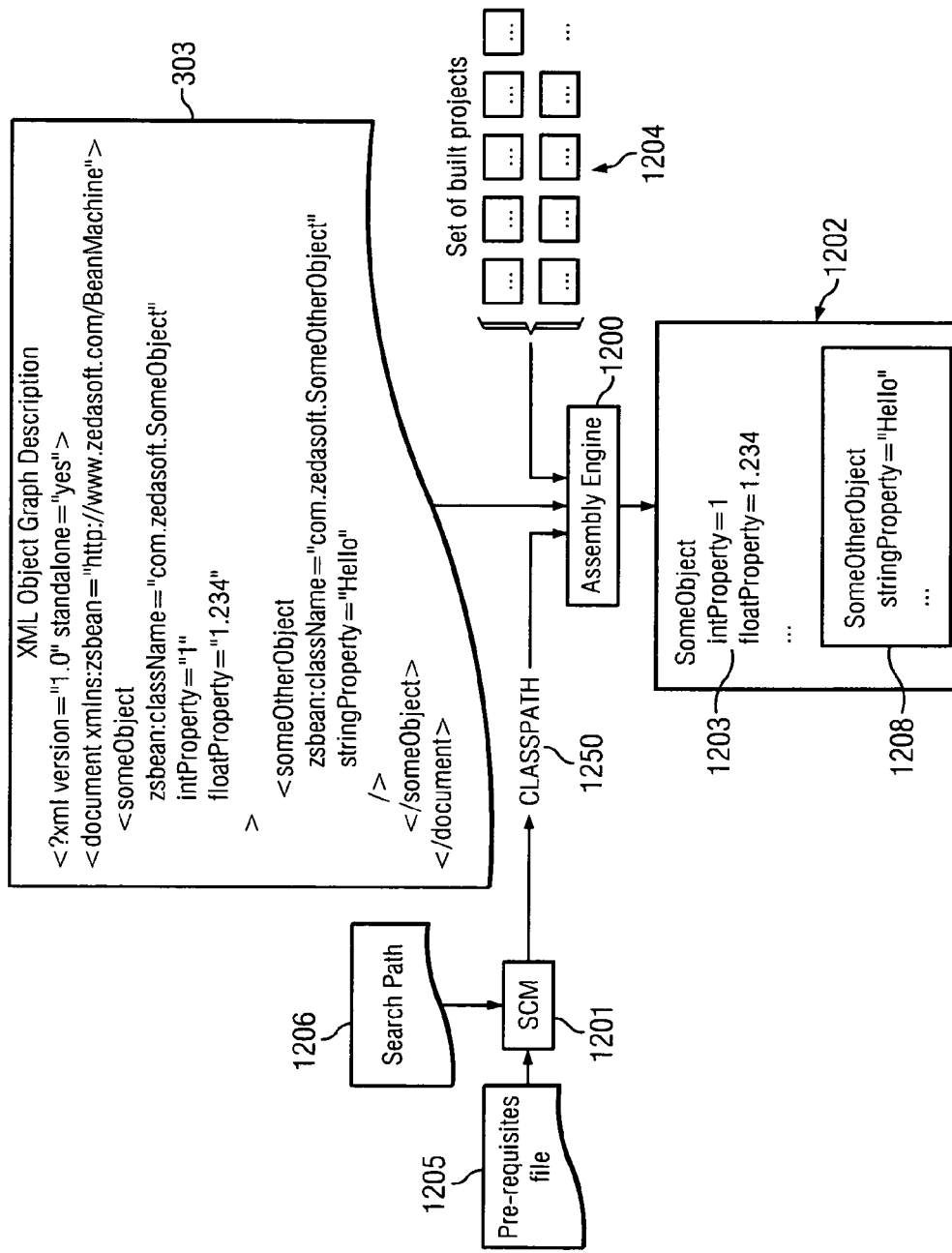
FIG. 12 is schematic of the assembly of an object graph from an object graph description.

FIG. 12 is a block diagram illustrating the components of life-cycle container assembly. Software component manager 1201 manages class availability while assembly engine 1200 manages object initialization and performs object graph assembly. A set of built projects 1204, comprising a plurality of class files, is located on disk storage and provided to assembly engine 1200. Software component manager 1201 provides assembly engine 1200 and the runtime environment with classpath 1250, which is a list of all possible persistent storage locations from which required class files and supportive components are loaded. The assembly engine uses classpath 1250, object graph description 303, and the set of built projects 1204 to instantiate contained objects 1203 and 1208 on an executable object graph 1202. Object graph description 303 is an input to assembly engine 1200 providing instructions to define a set of required classes and to initialize those classes.

The lines of code shown in object graph description 303 of FIG. 12 and in contained objects 1203 and 1208 are intended to show an example of form only. Many different types of object graphs and contained objects can be arbitrarily created using the object graph description, the set of class files, and the set of predefined containers.

A project is a development and deployment unit that consists of both source files (code) and non-code resources such as images, audio clips, and sundry data. A project always includes multiple source files defining one or more classes in terms of their interfaces and implementations. A project always represents some set of classes and supportive data that work together to represent a common concept. For example, one project might contain graphics support classes that could be used by and with many other projects. Another project might contain everything required to represent an F-16 fighter jet. Other projects might represent third-party open source software code while still other projects might represent classified or proprietary software code.

The set of projects are spread across different computer systems as deployment and runtime of the simulation typically occur at a location different than development. During deployment and runtime, a set of built projects including the binary class files are moved to a path on disk storage at a deployment site. When a project is built, a deployable version of that project is created that includes compiled classes and containers, the non-code resources and sundry data, and any other build by-products required for the compiled classes to function when executed by a simulation processor. One example of build by-products is a file that describes the project's subpath and version identifier.

In the context of Java, the compiled classes and containers, the non-code resources and sundry data, and required build by-products are grouped together in a ".jar" file which is a multi-file archive compatible with Java's runtime environment.

A filepath is comprised by concatenating a root path and a subpath. Each version of a built project is stored in at least one filepath location on the disk storage and every built project in the set of built projects has a name comprising a unique subpath and a unique project version identifier. Remote built projects can be accessed on remote disk storage by specifying the root path.

End-user simulations are assembled from class files and support data found in a set of prerequisite projects gathered from one or more development sources. Software component manager 1201 is provided with prerequisites file 1205 which includes all acceptable built project subpaths and version specifiers required for a simulation to function. Software component manager 1201 is also provided with search path 1206 which specifies all possible root paths from which built projects are collected according to the prerequisites file. An exact version match can be specified, for example, with a version specifier such as "1.5.3." Version specifiers can include wildcard characters for matching multiple acceptable project versions, for example, a prefix specifier such as "1.5.*" would match all subversions of version 1.5 and a this-version-or-later specifier such as "1.5+" would match all versions 1.5 and later (1.5.3, 1.6, 1.7, etc).

Software component manager 1201 is configured to resolve the set of prerequisite projects in the set of built projects 1204, by concatenating the root paths in search path 1206 to the specified subpaths in prerequisites file 1205. The concatenation is based on the version specifier that meets the restrictions of each prerequisite project.

Software component manager 1201 is configured to operate only at the time a simulation application is started. In operation, software component manager 1201 constructs a list of built project files and stores them in classpath 1250 as a list of absolute locations from which class files are loaded by assembly engine 1200. Preferably, software component manager 1201 resolves the absolute locations by finding the first built project per the search path whose project version identifier satisfies the version specifier for each project listed in the prerequisites file. Once a classpath 1250 is established, it remains the same for the lifetime of the simulation application. Assembly engine 1200 bases all class loading on classpath 1250. Software component manager 1201 can be used to manually substitute specific implementations for specific classes, for example, to support field maintenance patches, change classification levels, or replace domestic-use classes with export-approved counterparts.

Figure 13A:
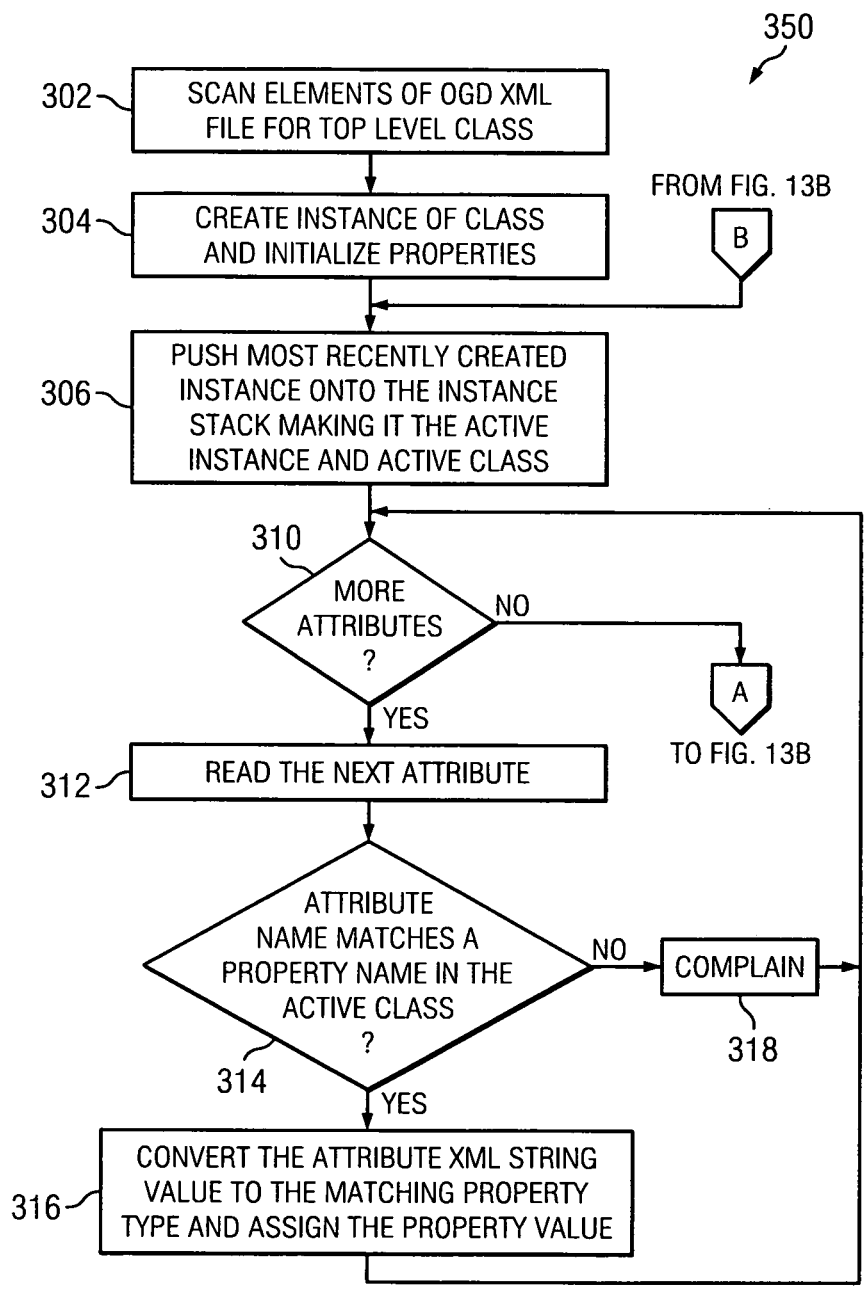
FIG. 13 is a flowchart diagram of a method of object graph assembly.
Figure 13B:
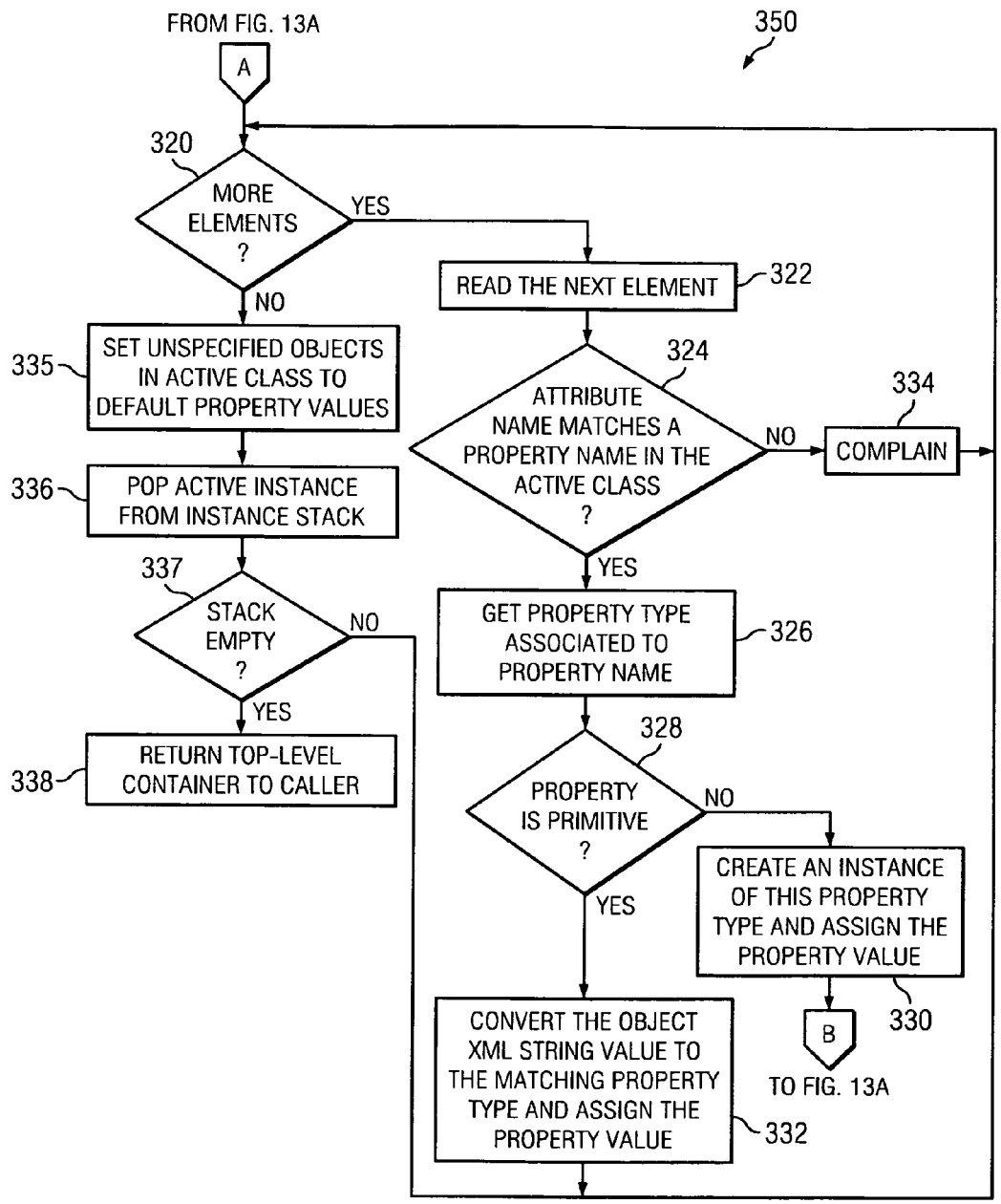

In use, assembly engine 1200 constructs an object graph from an object graph description (OGD) file as an executable set of XML instructions suitable for parsing and evaluation by a set of processors. The flow chart of FIG. 13 provides an exemplary method 350 executed by the assembly engine for constructing an object graph. Beginning with step 301, a simulation processor (or deployed LRU subsystem) in a runtime environment requests an executable object graph to be assembled into a runnable life-cycle container as specified in an OGD file. At step 302, the OGD file is scanned for a top level element by looking for opening and closing XML tags. At step 304 an instance of the top-level class associated with the top level element is created and initialized with default property values. At step 306 the last created instance is pushed onto an instance stack. Further to step 306, the most recently created instance is made the active instance and active class from which attributes are determined and populated including any default property values, and from which contained objects are determined and instantiated. The active class is responsible for supplying attribute and contained object names as well as default property specifications for the processing that follows step 306. The active class's property specifications including default property values are found on disk storage as determined from the classpath. XML attributes, elements and string values are specified in the OGD file according to XML syntax wherein each attribute and each element are specified between an opening tag and a closing tag. XML elements can specify primitive or complex objects. Complex objects include nested objects specified by nested XML elements.

At step 310 the active instance is processed by examining the XML attributes in the OGD file. At step 312, if an XML attribute is unprocessed, then the XML attribute's name is stored. At step 314, the XML attribute's name is compared to the property names specified in the active class. When a match is found between the XML attribute and a property name, step 316 is performed where the XML string value is converted to the property type associated with the property name and the property value is assigned in the active instance. If at step 314, there is no property name found to match the XML attribute, then at step 318, an appropriate error message is generated and communicated to the requesting agent.

Step 310 is repeated for all XML attributes specified in the OGD file for the active instance. The method 350 continues at step 320.

At step 320 the active instance is further processed by examining the OGD file for nested XML elements. If an XML element is found and unprocessed, then the XML element's name is stored at step 322. At step 324, the XML element's name is compared to the property names specified for objects included in the active class. When a match is found between the XML element and a property name, step 326 is performed where the object property type is determined from the active class. At step 328, the object property type is determined to be primitive or complex. A complex type represents a nested object containing additional elements whereas a primitive type represents a non-object datum such as a single number or string. If the object property type is primitive, step 332 is performed wherein the XML string value is converted to the object property type and the object property value is assigned in the active class. If at step 328, the object property type is not primitive, then step 330 is performed wherein an instance of a nested object with the object property type is created followed by step 306 wherein the instance of the nested object is pushed onto the instance stack and recursively processed according to the steps 310 and 320 and intervening steps.

If at step 324, there is no property name found to match the XML element, then at step 334, an appropriate error message is generated and communicated to the requesting agent.

Step 320 is repeated for all XML elements specified in the OGD file for the active instance. If at step 320, there are no more XML elements to process for the active instance, then at step 335, all remaining property values for unspecified objects of the active instance are set to default values as inherited from the active class. The method 350 continues at step 336.

At step 336, the active instance is popped from the instance stack. At step 337, if the instance stack is not empty then the next element for the active instance is processed at step 320, if another element exists in the active instance. If at step 337, the instance stack is empty, then all attributes and nested elements of the top-level element have been processed and the method 350 completes at step 338, by returning the processed top-level element to the requesting simulation processor (or deployed LRU subsystem) as a top-level runnable life-cycle container encapsulating the executable object graph.

As to the execution of an object graph within the fractal containment frameworks, program instructions are carried out by the simulation processors that tell the top-level runnable life-cycle container to execute. The simulation processors will then carry out the executable instructions according to the instantiated runnable container class included in the runnable life-cycle container. The instantiated runnable container class starts a continuous update service that executes a pre-determined number of update passes per second and continues updating until requested to stop by an external controller.

During an update pass, the top-level runnable life-cycle container visits each of its contained objects and runs the contained objects. Any nested containers will in turn tell their contained objects to run and update. This update pass continues through the hierarchy of contained objects defined by object graph until all contained objects and nested contained objects have finished executing. Then the top-level container waits for the next update pass. At the next update pass the process repeats.

Also, during an update pass, there is input data coming in to the simulation system from the set of input devices and there is stimulus data pushed out from the simulation system to the set of output devices. The input data is injected into the simulation system asynchronously through a communications channel to the set of simulation processors. The instantiated runnable container class acquires the input data from the communications channel and takes appropriate action, such as forwarding the input data to a contained object.

Figure 14:
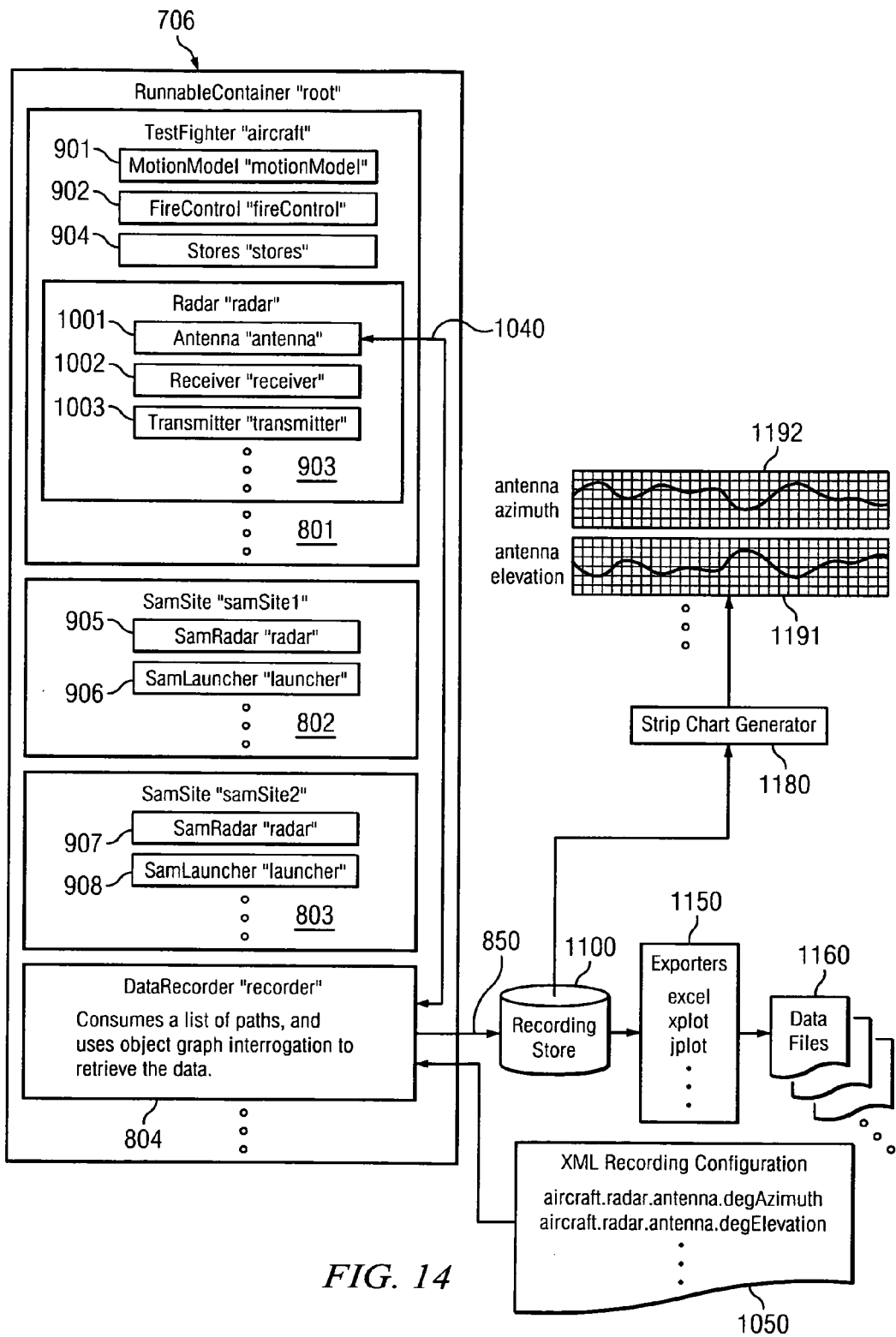
FIG. 14 is a schematic of interrogating and recording data in a data recorder object of a life-cycle container in a recording store.

Referring to FIG. 14, when implemented with a language that supports a public runtime system with field-level access, fractal containment architecture allows a simulation user to interrogate ad-hoc data anywhere in the object graph during execution. The collection of data and interrogation is accomplished by evaluating a list of symbolic paths 1050 against container 706. A symbolic path 1040 in list of symbolic paths 1050 locates an object of interest, such as object antenna 1001, by specifying every object name between runnable life-cycle container 706 and the final object of interest separated by period symbol.

XML configuration file 1050 is accessible by data recorder container 804 and includes the list of symbolic paths 1040. Data recorder container 804 is programmed with instructions to load and interrogate the list of symbolic paths from the XML configuration file and further programmed to transfer any extracted data to external data pipeline 850 based on the list of symbolic paths.

In FIG. 14, runnable life-cycle container 706 contains test fighter container 801, SAM site container 802, SAM site container 803, and data recorder container 804. Test fighter container 801 contains motion model container 901, fighter control container 902, weapon container 904 and radar container 903. Radar container 903 contains objects antenna 1001, receiver 1002, and transmitter 1003. SAM site container 802 contains objects SAM radar 905 and SAM launcher 906. SAM site 803 contains objects SAM radar 907 and SAM launcher 908.

For example, suppose antenna 1001 of radar container 903 includes a simple data attribute named "degAzimuth." The symbolic path "aircraft.radar.antenna" identifies antenna 1001 in the object graph. The value of "degAzimuth" attribute can be identified and extracted by evaluating the path "aircraft.radar.antenna.degAzimuth" against runnable life-cycle container 706. Appending the name of the object of interest, "degAzimuth," within antenna 1001 lets the user extract azimuthal data for antenna 1001 into an external data pipeline 850.

A recording store 1100, connected to external data pipeline 850, receives the extracted data from data recorder container 804 and stores the extracted data in a set of raw data files in persistent storage such as a disk drive. Generally, a set of data recorders are included in a given life-cycle container, the set of data recorders configured to store a set of raw data files in the recording store.

A data exporter 1150 is programmed to read the raw data files from recording store 1100 and convert them to a set of processed data files 1160 in a selectable format. In the preferred embodiment, the formats are selected from the group of excel format, csv format, xplot format and jplot format. Other common formats suitable for export to data manipulation and graphical analysis are conceived in many other embodiments.

A strip chart generator 1180 is programmed to read the raw data files, convert and display the data to a plurality of graphical strip chart displays. Exemplary graphical strip chart displays are the antenna azimuth display 1192 and antenna elevation display 1191.

In an exemplary operation, container 706 executes a life-cycle wherein data recorder container 804 extracts data from various contained objects and transfers the extracted data to recording store 1100. Recording store 1100 then sends the data to a strip chart generator 1180 and an exporter 1150. Strip chart generator 1180 then produces graph 1191 and graph 1192. Exporter 1150 also produces a plurality of data files 1160 suitable for further analysis at a later time. Generalizing the exemplary embodiment of FIG. 14, an arbitrary number of paths within a plurality of contained objects can be interrogated and recorded within the limits of computer processing power.

It will be appreciated by those skilled in the art that modifications can be made to the embodiment disclosed and remain within the inventor's concept. Therefore, this invention is not limited to the specific embodiment disclosed, but is intended to cover changes within the scope and the spirit of the claims.

The invention claimed is:

1. A simulation system in an execution environment having a set of processors and a memory, comprising:
   a computer readable media including a set of assembly instructions to construct an object graph from a set of contained objects;
   the set of assembly instructions, when executed by the set of processors, assemble the set of contained objects into a primary container in the memory according to the object graph;
   the primary container including a set of method instructions, that when executed by the set of processors, carry out a primary life-cycle in the execution environment according to the object graph;

the primary container is further programmed with instructions, that when executed by the set of processors, performs the steps of:
identifying each contained object in the set of contained objects by the set of unique names;
notifying each of the set of contained objects of structural changes in the primary container;
and, managing execution of each of the set of contained objects;
wherein each member object of the set of contained objects is programmed with object instructions, that when executed by the set of processors, discover a life-cycle container responsible for implementing the member object's life-cycle;
the set of contained objects includes a first life-cycle container having a first subset of objects selected from the set of contained objects;
the first life-cycle container including a first set of instructions, that when executed by the set of processors, carry out a first life-cycle in the execution environment for the first subset of objects;
the first life-cycle container includes further instructions, that when executed by the set of processors, performs the steps of:
identifying the first life-cycle container in the primary container by the unique name;
notifying each of the first subset of objects of structural changes in the first life-cycle container;
and, managing execution of each of the first subset of objects.

2. The simulation system of claim 1, wherein the computer readable media includes an external file at runtime.

3. The simulation system of claim 1 wherein the set of assembly instructions is in XML format.

4. The simulation system of claim 1, wherein the first life-cycle container has a unique name.

5. The simulation system of claim 1, wherein the set of contained objects includes a second life-cycle container having a second subset of objects selected from the set of contained objects;
the second life-cycle container including a second set of instructions in the memory, that when executed by the set of processors, carry out a second life-cycle in the execution environment for the second subset of objects.

6. The simulation system of claim 1, wherein the object instructions, when executed by the set of processors, protect each member object of the set of contained objects from another member object's behavior during life-cycle execution.

7. The simulation system of claim 1, wherein the set of contained objects has a set of unique names.

8. The simulation system of claim 1, wherein the computer readable media further includes a classpath, an XML file, and at least one class file;
the set of assembly instructions, when executed by the set of processors, assemble the set of contained objects into a primary container in the memory according to the object graph from the classpath, the XML file, and the at least one class file.

9. The simulation system of claim 8, wherein the computer readable media further comprises a prerequisites file, a search path and a collection of built projects wherein each built project has a unique project version identifier.

10. The simulation system of claim 9, wherein the prerequisites file includes a set of version specifiers and a set of subpaths for a subset of the collection of built projects.

11. The simulation system of claim 10, wherein the search path includes a set of root paths for the collection of built projects.

12. The simulation system of claim 11, including the set of assembly instructions, that when executed by the set of processors, further perform the steps of:
constructing a set of filepaths by concatenating the set of root paths and the set of subpaths;
determining a matching set of projects by matching the set of version specifiers to each unique project version identifier associated with each built project specified by the set of filepaths;
creating the classpath as a list of filepaths associated with the matching set of projects.

13. The simulation system of claim 8, wherein the XML file includes the at least one class to be instantiated.

14. The simulation system of claim 13, wherein the XML file includes a set of property values for a set of attributes in the at least one class.

15. The simulation system of claim 13, wherein the XML file includes a set of elements contained in the at least one class.

16. The simulation system of claim 15, wherein the XML file includes a set of property values for a set of properties included in each element in the set of elements.

17. A simulation system comprising:
a first development environment comprising a first computer system having a first storage media, a first source code stored on the first computer system, a first compiler, a first set of class files compiled from the first source code stored on the first storage media, and a first set of object graph definitions stored on the first storage media;
a first runtime environment comprising a simulation control computer with a first memory including a first set of runtime instructions, wherein the simulation computer is in communication with the first computer system;
the first set of runtime instructions, when executed by the simulation control computer, performs the step of generating an object graph based on the first set of class files and the first set of object graph definitions, and performs the step of generating a classpath for the assembly engine, the classpath including a set of filepaths to a set of built projects, the set of built projects including the first set of class files;
wherein the object graph comprises a set of life-cycle containers and a set of contained objects, and the object graph further comprises a life-cycle LRU (line replaceable unit) container and a set of LRU portable containers, wherein an LRU is an essential subsystem which is removable and replaceable to restore a host platform to an operational ready condition;
wherein the first source code includes a set of interface definitions for the set of life-cycle containers and the set of LRU portable containers, and the first source code includes a set of implementation definitions for the set of interface definitions;
a second runtime environment comprising a set of simulation processors and a second memory including a second set of runtime instructions, that when executed by the set of simulation processors, manages and executes the life-cycles of each container in the set of life-cycle containers;
a set of deployed physical units including a deployed runtime environment comprising a deployed set of processors and a deployed memory having a set of deployed runtime instructions, and the set of deployed runtime instructions, when executed by the deployed set of processors, performs the steps of:
  receiving the LRU life-cycle container and the set of LRU portable containers;
  and, executing the life cycles of the LRU life-cycle container and the set of LRU portable containers;
at least one LRU portable container, which is suitable for deployment in a deployed physical unit, is an unmodified life-cycle container suitable for simulation by the set of simulation processors;
and at least one simulation processor in the set of simulation processors is in communication with at least one deployed physical unit while a simulation is in process and while a deployed physical unit is operating.

18. The simulation system of claim 17, wherein the first runtime environment also includes a pre-requisites file.

19. The simulation system of claim 18 wherein the prerequisites file includes a set of project version specifiers and a set of subpaths.

20. The simulation system of claim 18 wherein the first runtime environment also includes a search path.

21. The simulation system of claim 20 wherein the search path includes a set of root paths.

22. The simulation system of claim 17 wherein the first set of object graph definitions is in XML file format.

23. The simulation system of claim 17 wherein the first source code includes a set of interface definitions for the set of life-cycle containers and the set of contained objects.

24. The simulation system of claim 23 wherein the first source code includes a set of implementation definitions for the set of life-cycle containers and the set of contained objects according to the set of interface definitions.

25. The simulation system of claim 17 wherein the first development environment further comprises a first set of executable containers compiled from the first source code.

26. The simulation system of claim 25 wherein the first set of runtime instructions, when executed by the simulation control computer, performs the step of generating an object graph based on the first set of class files, the first set of executable containers and the first set of object graph definitions.

27. The simulation system of claim 17 further comprising:
  a second development environment comprising a second computer system having a second storage media, a second source code, a second set of class files generated from the second source code, and a second set of object graph definitions;
  wherein the simulation computer is in communication with the second computer system;
  and, the first set of runtime instructions, when executed by the simulation control computer performs the step of generating an object graph based on the first set of class files, the second set of class files, and at least one object graph description selected from the first set of object graph definitions and the second set of object graph descriptions.

28. The simulation system of claim 27 wherein the first source code and the second source code include a common set of interface definitions.

29. The simulation system of claim 28 wherein the first source code includes a first set of implementations and the second source code includes a second set of implementations; and, wherein at least one implementation in the second set of implementations is not included in the first set of implementations.

30. The simulation system of claim 29 wherein the first set of implementations are domestic-use implementations and the second set of implementations are export-approved implementations.

31. The simulation system of claim 29 wherein the first set of implementations are non-proprietary to an organization and the second set of implementations are proprietary to the organization.

32. The simulation system of claim 29 wherein the first set of runtime instructions and the second set of runtime instructions include additional instructions, that when executed by the simulation control computer and the set of simulation processors, secure the second set of implementations from exposure to a simulation user.

33. The simulation system of claim 27 wherein the second development environment further comprises a second set of executable containers compiled from the second source code.

34. The simulation system of claim 33 wherein the first set of runtime instructions, when executed by the simulation control computer performs the step of generating an object graph based on the first set of class files, the first set of executable containers, the second set of class files, the second set of executable containers and at least one object graph description in the first set of object graph definitions and the second set of object graph descriptions.

35. The simulation system of claim 34 wherein the first source code, the first set of class files and the first set of object graph definitions are non-proprietary.

36. The simulation system of claim 35 wherein the second source code, the second set of class files and the second set of object graph definitions are proprietary to an organization.

37. The simulation system of claim 34 wherein the first source code, the first set of class files and the first set of object graph definitions are unclassified by a government organization.

38. The simulation system of claim 37 wherein the second source code, the second set of class files and the second set of object graph definitions are classified by a government organization.

39. The simulation system of claim 27 wherein the second set of class files and the second set of object graph definitions are encrypted.

40. The simulation system of claim 39 wherein the first set of runtime instructions, when executed by the simulation control computer, performs the step of decrypting the second set of class files and the second set of object graph definitions.

41. The simulation system of claim 17, wherein the second set of runtime instructions, when executed by the second set of processors, assist the deployed runtime environment while in operation.

42. The simulation system of claim 17, wherein the object graph further comprises at least one operational program code;
  and, wherein the deployed runtime environment is programmed to receive and execute the at least one operational program code.

43. The simulation system of claim 42 wherein the at least one operational program code is an operational flight program for an aircraft.

* * * * *

UNITED STATES PATENT AND TRADEMARK OFFICE
CERTIFICATE OF CORRECTION

PATENT NO.        : 8,881,094 B2
APPLICATION NO.   : 13/317447
DATED             : November 4, 2014
INVENTOR(S)       : Robert Allen Hatcherson et al.

Page 1 of 1

It is certified that error appears in the above-identified patent and that said Letters Patent is hereby corrected as shown below:

In the Specification

In Column 4    line 31    change "JO" to --IO--

Signed and Sealed this
First Day of September, 2015

Michelle K. Lee
*Director of the United States Patent and Trademark Office*